United States Patent
Kasamatsu et al.

[11] Patent Number: 5,841,608
[45] Date of Patent: Nov. 24, 1998

[54] HEAD SLIDER WITH PROJECTIONS ARRANGED ON RAILS THEREOF

[75] Inventors: Yoshiharu Kasamatsu; Toru Yokohata; Takayuki Yamamoto; Takashi Toyoguchi; Seiji Yoneoka; Yoshifumi Mizoshita, all of Kanagawa, Japan

[73] Assignee: Fujitsu Limited, Kawasaki, Japan

[21] Appl. No.: 521,265

[22] Filed: Aug. 30, 1995

[30] Foreign Application Priority Data

Aug. 30, 1994 [JP] Japan ................................. 6-205474
Feb. 3, 1995 [JP] Japan ................................. 7-017341
Apr. 17, 1995 [JP] Japan ................................. 7-091196

[51] Int. Cl.$^6$ ........................................................ G11B 5/60
[52] U.S. Cl. ........................................................... 360/103
[58] Field of Search ..................................... 360/103, 122

[56] References Cited

U.S. PATENT DOCUMENTS

| | | | |
|---|---|---|---|
| 3,823,416 | 7/1974 | Warner | 360/122 |
| 5,067,037 | 11/1991 | Ananth et al. | 360/103 |
| 5,136,445 | 8/1992 | Zak | 360/103 |
| 5,200,867 | 4/1993 | Albrecht et al. | 360/103 |
| 5,267,104 | 11/1993 | Albrecht et al. | 360/103 |
| 5,278,711 | 1/1994 | Gregory et al. | 360/103 |
| 5,345,353 | 9/1994 | Krantz et al. | 360/103 |
| 5,388,017 | 2/1995 | Franco et al. | 360/103 |
| 5,418,667 | 5/1995 | Best et al. | 360/103 |

FOREIGN PATENT DOCUMENTS

| | | |
|---|---|---|
| 51-71117 | 6/1976 | Japan . |
| 55-105857 | 8/1980 | Japan . |
| 57-569 | 1/1982 | Japan . |
| 61-151827 | 7/1986 | Japan . |
| 61-250880 | 11/1986 | Japan . |
| 62-61011 | 4/1987 | Japan . |
| 63-37874 | 2/1988 | Japan . |
| 1-319188 | 12/1989 | Japan . |
| 2-177009 | 7/1990 | Japan . |
| 4-1984 | 1/1992 | Japan . |
| 4-28070 | 1/1992 | Japan . |
| 4-032080 | 2/1992 | Japan ................... 360/103 |
| 4-324175 | 11/1992 | Japan . |
| 5-54582 | 3/1993 | Japan . |
| 5-089626 | 4/1993 | Japan ................... 360/103 |
| 5-307852 | 11/1993 | Japan . |
| 6-052646 | 2/1994 | Japan ................... 360/103 |

OTHER PUBLICATIONS

Japanese Patent abstract of 4–281209 Tadatoshi Suenaga, p–1488, vol. 171 No. 78. Feb. 16, 1993.

*Primary Examiner*—Craig A. Renner
*Attorney, Agent, or Firm*—Greer, Burns & Crain, Ltd.

[57] ABSTRACT

The head slider has a substrate with a transducer on an outflow end of the substrate and rail planes, facing a disk, formed along sides and a front of the substrate. In addition, projections extend from the rail planes toward the disk. Two projections are near the outflow end of the substrate while one projection is near the inflow end of the substrate.

9 Claims, 21 Drawing Sheets

Fig. 3A
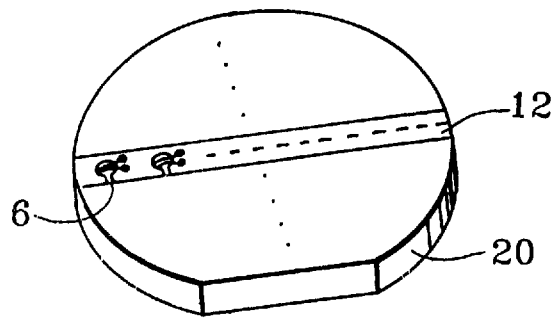
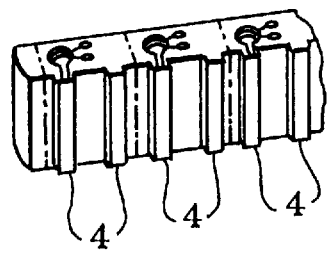
Fig. 3B
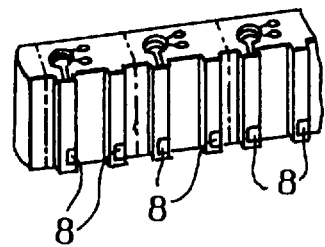
Fig. 3C
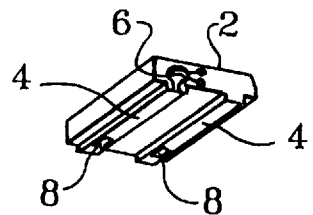
Fig. 3D

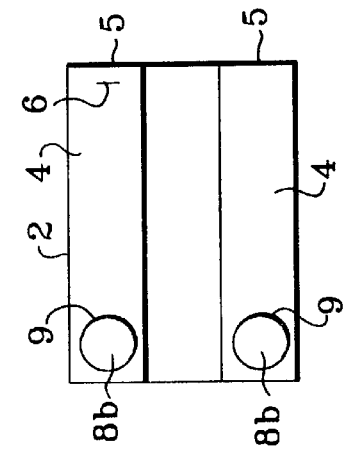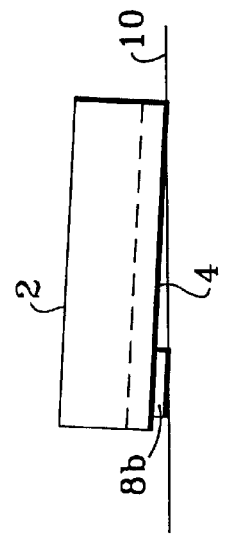
Fig. 6A
Fig. 6B
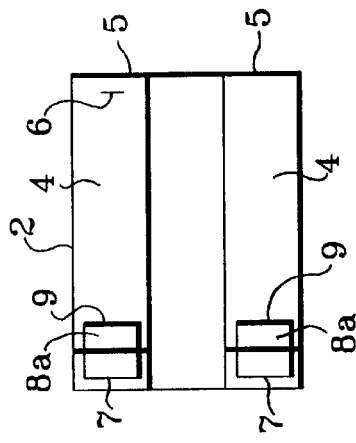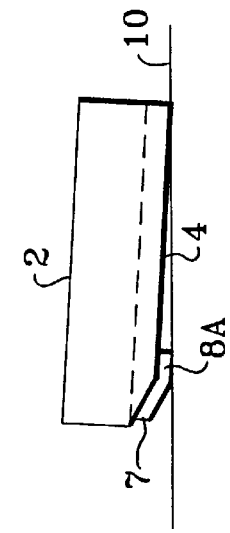
Fig. 5A
Fig. 5B
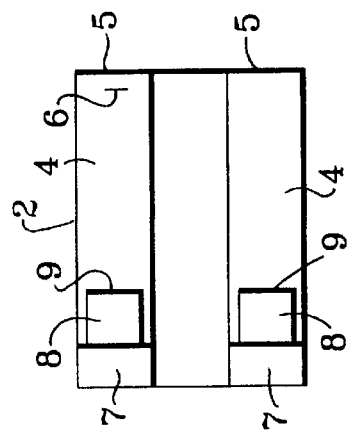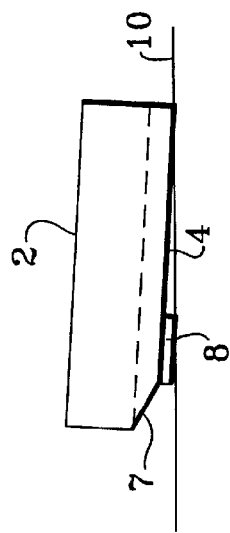
Fig. 4A
Fig. 4B

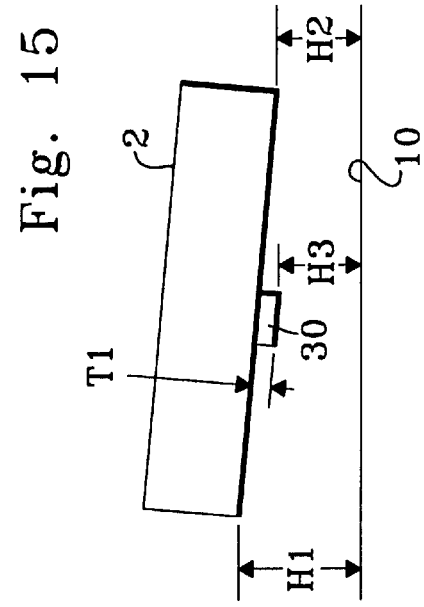
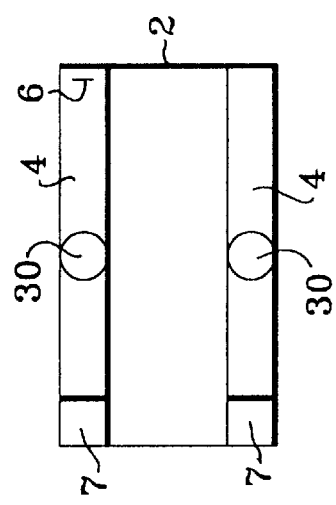
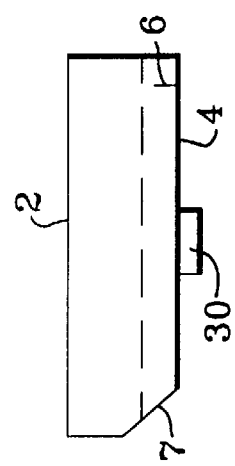
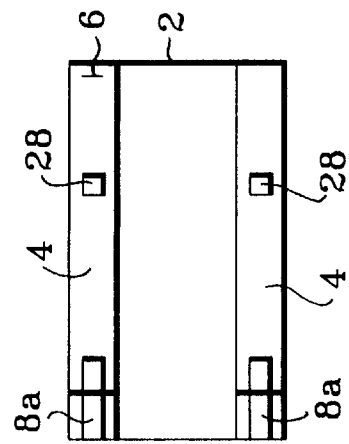
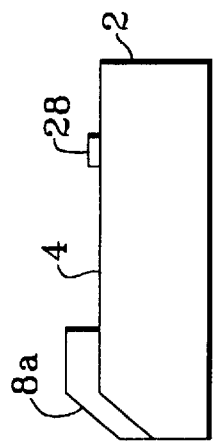

Fig. 18D
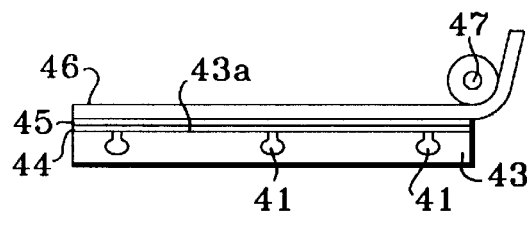
Fig. 18H
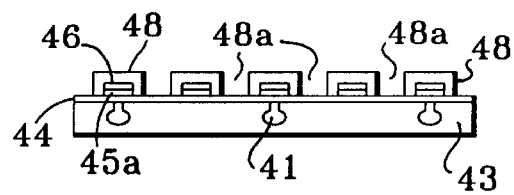
Fig. 18E
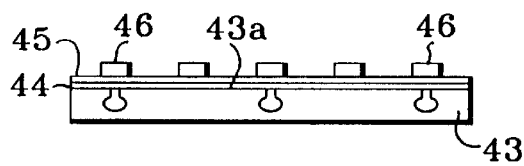
Fig. 18I
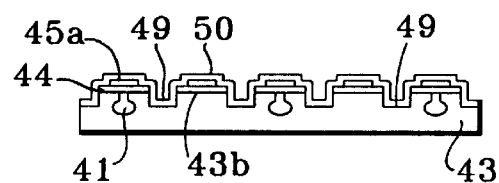
Fig. 18F
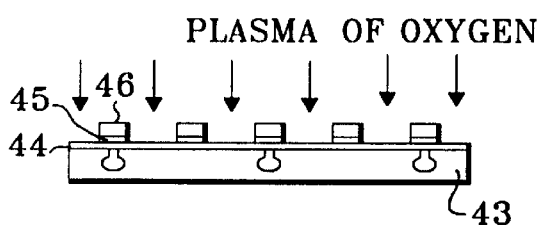
Fig. 18J
Fig. 18G
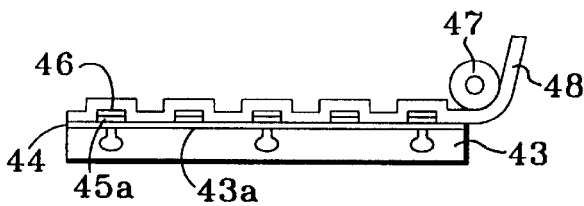
Fig. 18K
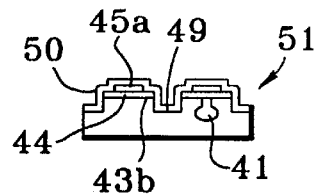

(PRESENT INVENTION)

HEAD SLIDER WITH PROJECTIONS ARRANGED ON RAILS THEREOF

BACKGROUND OF THE INVENTION

1. Field of the Invention

The present invention relates generally to a magnetic recording drive, a head slider of the magnetic recording drive, a manufacturing method of the head slider, and more particularly to a head slider operated according to a contact start stop (CSS) method, a magnetic recording drive in which the head slider can float over a surface of a magnetic recording medium, and a manufacturing method of the head slider.

2. Description of the Prior Art

In a magnetic disk apparatus, a flying head operated according to a contact start stop (CSS) method is adopted. In the CSS method, a magnetic head makes contact with a surface of a magnetic disk when the magnetic disk apparatus is not in operation. A head slider of the magnetic head is lifted up from the magnetic disk surface when the magnetic disk drive is in operation. Therefore, the head slider of the magnetic head slides over the magnetic disk surface when the disk stands and stops. In this case, a read-write magnetic head device is attached to the slider.

The head slider of the magnetic head flies over the magnetic disk surface due to an air flow on the magnetic disk surface generated by the rotation of the magnetic disk. The head slider flies according to a principle of a dynamic air pressure bearing at the magnetic disk surface.

To make the head slider fly, a convex portion, in which a floating force is generated by the air flow, is formed on a surface of the head slider facing the magnetic disk, and an air inflow region of the convex portion for the air flow is formed in a taper shape. The convex portion is generally called a rail surface (or a flying surface). The rail surface of the head slider makes contact with the magnetic disk surface before starting the operation of the magnetic disk or after stopping the operation of the magnetic disk. Therefore, to prevent wear and/or damage of the magnetic disk surface, a protective film made of a hard material such as carbon or the like is formed on a recording layer of the magnetic disk. In addition, a lubricant layer is formed on the protective film to reduce friction and wear of the protective film. Therefore, the durability of the protective film is improved.

Also, as the magnetic disk drive is downsized and information is recorded in a higher recording density in the recording disk, a flying height (or a space) between the magnetic head and the magnetic disk is intended to be lowered. To lower the flying height, it is required to suppress the roughness of the magnetic disk surface as small as possible to prevent an undesirable contact of the magnetic head set in a flying condition with the magnetic disk.

However, when the magnetic disk is rest in a stop condition, a contact area of the magnetic disk with the head slider becomes larger as the magnetic disk surface becomes smooth. Therefore, stiction (or adhesion) of the head slider to the magnetic disk easily occurs, and a strength of the stiction increases. Because of the increase of the strength of the stiction, a load required to start rotating the magnetic disk increases. In this case, because a torque of a spindle motor for rotating the magnetic disk is decreased as the magnetic disk apparatus are downsized, there is a case that the magnetic disk cannot be rotated because of the weakness of the torque. Also, the suspension for supporting the head slider, is easily damaged and broken when the rotation of the magnetic disk is started.

To suppress the stiction, an idea that a head slider flying surface facing the magnetic disk is crown-processed along its longitudinal direction and decrease a contact area of the head slider with the magnetic disk is proposed. However, though the head slider formed in a crown shape is effective to prevent the stiction, it is difficult to form a large number of head sliders in the crown shape with the tight accuracy for mass production. Also, because the head slider is crown-processed along its longitudinal direction, a distance between a magnetic transducer arranged on an air outflow end side of the convex portion and the magnetic disk surface becomes larger than that between the rail surface and the magnetic disk surface. Therefore, there is a drawback that a spacing loss occurs.

Also, to suppress the stiction, an idea that projections are provided on rail surfaces (or an air bearing surface) of the head slider facing the magnetic disk to decrease a contact area of the magnetic disk with the head slider is, for example, disclosed in the Published Unexamined Japanese Patent Application (PUJPA) No. S51-71117.

Recently, the flying height is equal to or less than 100 nm. Therefore, it is difficult to precisely adjust a height of the projection by controlling an etching time required to etch the rail surface, and there is a drawback that a yield rate of the projection is lowered. Also, it is required to accurately adjust the height of the projection to improve a stable operation of the magnetic disk apparatus when the flying of the head slider is started or stopped.

The whole weight of the head slider loads onto projections having small surface. This causes large friction of the projection surfaces on the disk surface. As a result, the projections wear out rapidly.

Also, even though a plurality of projections are provided on the head slider, when the number of projections is decreased to reduce the contact area, a contact pressure at the contact area of the projections is increased, and there is a case that the lubricant layer of the magnetic disk is worn away. As a result, a solid-to-solid contact area is increased, and the surfaces of the projections and the magnetic disk are worn because of friction between the projections and the magnetic disk. Also, the stiction between the projections and the magnetic disk is increased, and the reliability for operating the head slider is lowered.

SUMMARY OF THE INVENTION

The first objective of the present invention is to provide a head slider in which the stiction to a magnetic disk is small and the wearing of projections is reduced. In order to achieve this objective, it is efficient to make the head slider compact and to reduce the magnitude of a load applied to the head slider.

Also, the second object of the present invention is to provide a head slider which is stably operated when a flying operation is started or stopped and is manufactured at a high yield rate. Also, the second object is to provide a magnetic recording drive utilizing the head slider and a manufacturing method of the head slider.

Also, the third object of the present invention is to provide a magnetic recording drive in which the stiction of a head slider to the recording disk is lowered and the breakage of a lubricant layer of the recording disk is prevented, Also, the third object is to provide a manufacturing method of the head slider.

The first object is also achieved by providing a head slider for a magnetic recording drive, comprising: a substrate for holding a transducer, information being read or written from/in a recording disk by the transducer; a pair of rail planes, arranged on both end sides of a surface of the substrate facing the recording disk, for receiving a floating force caused by a rotation of the recording disk; and a pair of projection elements arranged on the rail planes to set a first distance between each of the projection elements and the recording disk to a value longer than a second distance between an air outflow end of the substrate facing the recording disk and the recording disk on condition that the rail planes receives the floating force and the substrate flies over the recording disk.

In the above configuration, a pair of projection elements are arranged on the rail planes on condition that the first distance between each of the projection elements and the recording disk is longer than the second distance between an air outflow end of the substrate facing the recording disk and the recording disk when the substrate flies over the recording disk. Therefore, there is no probability that the projection elements cause damage to the recording disk when information is read or written from/in the recording disk by the transducer. Because the transducer arranged at the air outflow end of the substrate becomes close to the recording disk as a recording density of information in the recording disk is heightened, it is required to prevent the recording disk from being damaged by the projection elements.

It is preferred that each of the projection elements comprise a plurality of projections arranged on one of the rail planes, and a point of the substrate to which a center of loading force is applied is placed in a region surrounded by the projections.

In this case, because a point of the substrate to which a loading force is applied is placed in a region surrounded by three or more projections, the projections contact to the disk in stability and the stiction of the projections to the disk is in stability.

Also, it is preferred that each of the rail planes be composed of a taper plane placed on an air inflow end side of the substrate and a flat plane placed in a region ranging from a central position to an air outflow end side of the substrate, each of the projection elements be placed on a boundary region ranging from the taper plane to the flat plane of one rail plane, and at least one of the projection elements have a bent portion curved in a thickness direction of the substrate perpendicular to the surface of the substrate.

When the head slider is lifted up from the recording disk, it is required that the projection elements do not cause damage to the recording disk. Because each of the rail planes has a taper plane on the air inflow end side of the substrate and one of the projection elements has a bent portion curved in a thickness direction of the substrate, an airflow smoothly pass along the taper plane and a bent surface of the projection element without any trouble, and the head slider is smoothly lifted up. Therefore, the projection elements do not cause damage to the recording disk.

Also, it is preferred that each of the projection elements be made of a material selected from the group consisting of amorphous carbon, diamond-like carbon and oxide.

Because each of the projection elements is made of a hard material such as amorphous carbon, diamond-like carbon or oxide, it is difficult to cause damage to the projection elements. Therefore, there is no probability that a damaged projection element causes damage to the recording disk.

The second object is achieved by providing a head slider for a magnetic recording drive, comprising:

a substrate for holding a transducer, information being read or written from/in a recording disk by the transducer; a pair of rail planes, arranged on both end sides of a surface of the substrate facing the recording disk, for receiving a floating force caused by a rotation of the recording disk to make the substrate fly over the recording disk; a plurality of first projections arranged on portions of the rail planes placed on an air inflow end side of the substrate; and a plurality of second projections arranged on portions of the rail planes placed on an air outflow end side of the substrate, a height of each of the second projections being lower than that of each of the first projections.

The reason to make the respective height of the projections unequal is described next. If all projections were made low in height, the rail plane other than the projections might come into contact with the magnetic disk due to a distortion produced on the head slider. Therefore, the respective heights of the projections on an air inflow end side, where the head slider is highly lifted up during a rotation of the head slider, are made higher so as to ensure enough margin for the projections and the magnetic disk not to contact with each other.

The second object is also achieved by providing a head slider for a magnetic recording drive, comprising: a substrate for holding a transducer, information being read or written from/in a recording disk; a rail plane, arranged on a surface of the substrate facing the recording disk, for receiving a floating force caused by a rotation of the recording disk; first projection arranged on a first portion of the rail plane placed on an air inflow end side of the substrate; a second projection arranged on a second portion of the rail plane placed on an air outflow end side of the substrate; and a third projection arranged on a third portion of the rail plane placed on the air outflow end side of the substrate.

Because the first, second and third projections are arranged in a triangular shape, when the recording disk is not rotated, the head slider can be stably put on the recording disk. Also, when the head slider is lifted up from the recording disk, the first projection is first lifted up before the second and third projections are lifted up. Therefore, because only the first projection is arranged on the air inflow end side of the head slider, a contact area between the first projection and the recording disk on the air inflow end side of the head slider can be smaller than the air outflow end side. Therefore, a strength of the stiction between a portion of the head slider placed on the air inflow end side and the recording disk can be made small, and the head slider can be easily flying up when the rotation of the recording disk is started.

It is preferred that the rail plane comprises a pair of side rail planes on which the second and third projections are arranged and a center rail plane arranged between the side rail planes through a pair of slits, the first projection being arranged on the center rail plane. The side rail planes may connect with the center rail plane without slits as shown in U.S. Pat. No. 5,212,608.

The second object is also achieved by providing a head slider for a magnetic recording drive, comprising: a substrate for holding a transducer, information being read or written from/in a recording disk by the transducer; a rail plane, arranged on a surface of the substrate facing the recording disk, for receiving a floating force caused by a rotation of the recording disk; a negative pressure generating region, arranged on the surface of the substrate facing the recording disk, for generating a negative pressure between the substrate and the recording disk; and three projections arranged on the rail plane.

In the above configuration, because a negative pressure generating region is arranged on the surface of the substrate facing the recording disk, the loading force of the head slider to the recording, the loading force of the head slider to the recording disk is lightened. Therefore, the rate of wearing of the projections is reduced remarkably.

The second object is more also achieved by provision of a head slider for a magnetic recording drive comprising the first projection on a rail plane of an air inflow end side and the second projection on a rail plane of an air outflow end side, an area of the first projection being smaller than that of the first projection.

When the rotation of the magnetic disk is started, the slider supported by the plate spring is lifted up from the surface of the magnetic disk according to a principle of a dynamic pressure air bearing in fluid lubrication. The air inflow end side portion of the slider is first raised up, and the air outflow end side portion of the slider is lifted up with the air inflow end side portion of the slider. The easier the air inflow end side portion of the slider is raised up, the shorter a lifting time of the slider.

The smaller an area of a top portion of the first projection placed on the air inflow end side of the slider, the smaller the frictional force. These experimental results denote that a strength of the stiction between the slider and the magnetic disk is decreased and a lifting time of the slider is shortened as the area of the top portion of the first projection becomes small.

The second projections placed on the air outflow end side of the rail planes are detached from the magnetic disk after the first projections are detached from the magnetic disk. Therefore, a loading force of the second projections to the magnetic disk is larger than that of the first projections to the magnetic disk. However, because an area of the top portions of the second projections is larger than that of the first projections to increase a mechanical strength of the second projections, the slider has a superior durability, and it is difficult therefore do damage to the slider.

Also, because the first projection is gently bent along the boundary area from the flat plane of the rail plane to the inclined plane, a top corner of the first projection facing the magnetic disk does not mechanically cause damage to the surface of the magnetic disk. Therefore, the damage of the first projections and the magnetic disk can be prevented.

The third object is achieved by providing a recording disk comprising: a recording medium; a head slider comprising a substrate with a transducer, a rail plane, arranged in relief on a surface of the substrate facing the recording medium, for making the head slider fly, and one or more projections arranged on the rail plane; and a lubricant layer arranged on the recording medium with a film thickness which is smaller than a height of each of the projections and is larger than a surface roughness of the recording medium.

In the above configuration, the recording medium is coated with a lubricant layer, and a film thickness of the lubricant layer is smaller than a height of each of the projections and is larger than a surface roughness of the recording medium. In this case, not only a surface of each of the projections is covered by a lubricant of the lubricant layer, but also a portion of the rail plane surrounding each of the projections is covered by the lubricant. Therefore, a meniscus radius of a meniscus portion formed around each of the projections is enlarged, and a strength of the stiction between the head slider and the recording medium can be reduced.

Also, a surface of the recording medium is perfectly covered by the lubricant layer because a film thickness of the lubricant layer is larger than a surface roughness of the recording medium. Therefore, there is no probability that the surface of the recording medium is abraded by the head slider even though the head slider is in contact with the recording medium during the rotation of the recording medium.

It is also preferred that each of the projections has a taper portion on its side surface, and an area of a cross section of each of the projections facing the rail plane is gradually increased along a direction from a top portion of each of the projections to the rail plane.

Because the taper portion is inclined against the recording medium to make an acute angle between the taper portion and the recording medium, the lubricant forced out from a clearance between the projection and the recording medium is easily moved up along a surface of the taper portion, and a meniscus portion having a large meniscus radius can be easily formed around each of the projections. Therefore, even though the film thickness of the lubricant layer is made small, the meniscus portion having a large meniscus radius can be reliably formed around each of the projections.

It is also preferred that a crown height of the rail plane be $1.27 \times 10^{-2}$ $\mu$m or less.

In the head slider having such a crown height, parts of the head slider other than the projections do not come into contact with the magnetic disk in spite that the height of the projections is low. When the parts of the head slider other than the projections come into contact with the magnetic disk, the stiction between the head slider and the magnetic disk increases.

It is also preferred that each of the projections be made of a material having a water repellent property or an oil repellent property.

In cases where a lubricant of the lubricant layer is made of a water-contained agent or an oil-contained agent, the projection can be easily detached from the recording medium, and the head slider can be easily lifted up from the recording medium.

The third object is also achieved by providing a head slider for a magnetic recording drive, comprising: a substrate for holding a transducer, information being read or written from/in a recording disk by the transducer; a rail plane, arranged on a surface of the substrate facing the recording disk, for receiving a floating force caused by a rotation of the recording disk to make the substrate fly over the recording disk; projections arranged on the rail planes; and lubricants for covering a top portion of the projections.

Because of the lubricant, a surface energy of the top portion of each of the projections is lowered, and the lubricant layer of the surface of the recording medium is not broken by the projections. Therefore, there is no probability that a solid contact between the projections and the recording medium occurs, and the abrasion of the projections and the abrasion of the recording medium can be suppressed. Also, a strength of the stiction between the projections and the recording medium is lowered, and a starting load required to start rotating the recording medium can be reduced.

It is preferred that the projection be made of an amorphous carbon and the lubricant be made of a fluorine-contained lubricant having a benzene ring. Also, it is preferred that the projection be made of an oxide and the lubricant be made of a fluorine-contained lubricant having a hydroxyl group.

Because the lubricant covering the top portion of each of the projections is made of a fluorine-contained lubricant having water repellency, it is difficult that water is concentrated around each of the projections. Therefore, a strength of the stiction between the projections and the recording medium can be reduced. In this case, it is applicable that the fluorine-contained lubricant be arranged on the rail plane.

Also, the third object is achieved by providing a manufacturing method of a head slider for a magnetic recording drive, comprising the steps of:

forming a rail plane on a substrate in which a transducer is held, a floating force being generated by the rail plane; forming one or more projections on the rail surface; coating the projection with a lubricant; and radiating ultra-violet light to the lubricant to tightly stick the lubricant on the projection.

Because the projection is coated with a lubricant and ultra-violet light is radiated to the lubricant, the lubricant can tightly stick to the projection. Therefore, the durability of the head slider is improved.

Also, the third object is achieved by providing a head slider for a magnetic recording drive, comprising: a substrate for holding a transducer, information being read or written from/in a recording disk by the transducer; a rail plane, arranged on a surface of the substrate facing the recording disk, for receiving a floating force caused by a rotation of the recording disk to make the substrate fly over the recording disk; and one or more projections arranged on the rail plane, surfaces of projections being made of a fluorinate carbon.

Also, the third object is achieved by providing a manufacturing method of a head slider for a magnetic recording drive, comprising the steps of:

forming a rail plane on a substrate in which a transducer is held, a floating force being generated by the rail plane; forming one or more projections made of a carbon hydroxide on the rail plane; and fluorinating surfaces of the projections with a mixing gas in which argon and fluorinate carbon are included.

In cases where a projection is formed out of carbon, when a surface of the projection is fluorinated, a surface energy of the projection is lowered. Therefore, it is difficult that a lubricant layer arranged on a surface of a recording medium is broken by the projection made of a fluorinate carbon, and the abrasion of the projections and the abrasion of the recording medium can be suppressed. In addition, a strength of the stiction between the projection and the recording medium is reduced, and a load required to start rotating the recording medium is reduced. Also, because the fluorinate carbon has water repellency, it is difficult that water is concentrated around each of the projections.

Also, the third object is achieved by providing a manufacturing method of a head slider for a magnetic recording drive, comprising the steps of:

forming a tranceducer protecting film and a projection material film on a substrate in that order; patterning the projection material film, the tranceducer protecting film and an upper portion of the substrate to form a concave portion; processing upper surfaces of the substrate projecting on both sides of the concave portion as a pair of rail planes; forming one or more first projections made of the projection material film on portions of the rail planes placed on an air inflow end side of the substrate by patterning the projection material film remaining on the rail planes.

It is preferred that the step of forming a rail plane protecting film includes: forming an intermediate film to be placed between the contact film and the rail plane protecting film, the step of forming projections includes; etching the contact film by using an etchant without etching the intermediate film.

Because the intermediate film functions as an etching stopper, the thickness of the first projections can be accurately set and be made uniform, and the thickness of the second projections can be accurately set and be made uniform. Therefore, a yield rate of the head slider can be improved.

The second object is also achieved by providing a manufacturing method of a head slider for a magnetic recording drive, comprising the steps of:

forming a projection forming film on a surface of a substrate used as a rail plane through an intermediate layer; covering a projection forming portion of the projection forming film with a first mask; removing the projection forming film not covered with the first mask by supplying a first etching gas to the projection forming film on condition that an etching rate of the first etching gas at the projection forming film is higher than that at the intermediate layer; and forming a projection out of the projection forming film placed under the first mask.

In the above manufacturing method, the projection forming film is patterned according to a photo-lithography technique to form the projection. In this case, because the intermediate layer is arranged between the projection forming film and the substrate and functions as an etching stopper, the height of the projection agrees with the thickness of the projection forming film. Therefore, the height of the projection can be accurately set.

It is preferred that the manufacturing method further comprise the steps of: forming a second mask, which is formed in a flying surface shape and has a window in a region in which a concave portion extending along an airflow is to be formed, on the intermediate layer and the first mask after the projection is formed in the step of forming a projection; etching the intermediate layer and an upper portion of the substrate through the window of the second mask to form the concave portion on the substrate etched; forming the rail plane on the intermediate layer not etched; and simultaneously removing the first and second masks.

In the above manufacturing method, the second mask is formed without moving the first mask, and the concave portion is formed. Therefore, the first and second masks can be simultaneously removed, and the processing of a photo-lithography for forming the concave portion and the rail plane can be simplified.

Also, it is preferred that the manufacturing method further comprise the step of: forming a protective film for protecting the intermediate layer arranged as an outermost surface of the rail plane after the step of simultaneously removing the first and second masks.

In cases where the intermediate layer is formed out of a material easily contaminated, the intermediate layer not covered by the projection is etched and removed to form the rail plane on the substrate not etched. Or, according to the present invention, the projection and the intermediate layer are covered by the protective film after the projection is formed, and the contamination of the intermediate layer can be prevented even though the intermediate layer can be easily contaminated.

Also, it is preferred that the step of covering a projection forming portion includes: forming the first mask by exposing and developing a dry film resist.

Because the first mask is formed out of the dry film resist, the thickness of the first mask can be uniformly set. Therefore, when the projection forming film is patterned to form the projection, the size of the projection can be precisely set.

Also, it is preferred that the step of forming the second mask includes: etching the first mask to reduce a thickness of the first mask to 10 µm or less; laminating a dry film resist on the first mask of which the thickness is reduced; and exposing and developing the dry film resist to form the second mask.

In cases where the second mask is formed out of the dry film resist, air bubbles can be easily confined in a clearance between the first mask and the second mask. However, the thickness of the first mask is set to 10 µm or less, any air bubble is not confined between the first mask and the second mask. Therefore, the second mask can be accurately patterned to form the concave portion, and the shape of the rail plane can be set with a high accuracy.

BRIEF DESCRIPTION OF THE DRAWINGS

FIGS. 3(a) to 3(d) are oblique views showing the manufacturing method of the magnetic head slider;

FIG. 4(a) is a schematic plan view of a magnetic head slider according to the second embodiment of the present invention;

FIG. 4(b) is a schematic side view of the magnetic head slider shown in FIG. 4(a);

FIG. 5(a) is a schematic plan view of a magnetic head slider according to the third embodiment of the present invention;

FIG. 5(b) is a schematic side view of the magnetic head slider shown in FIG. 5(a); disk 10.

FIG. 6(a) is a schematic plan view of a magnetic head slider according to the fourth embodiment of the present invention;

FIG. 6(b) is a schematic side view of the magnetic head slider shown in FIG. 6(a);

FIG. 13(a) is a schematic plan view of a magnetic head slider according to the tenth embodiment of the present invention;

FIG. 13(b) is a schematic side view of the magnetic head slider shown in FIG. 13(a);

FIG. 14(a) is a schematic plan view of a magnetic head slider according to the eleventh embodiment of the present invention;

FIG. 14(b) is a schematic side view of the magnetic head slider shown in FIG. 14(a);

FIG. 15 shows a relationship of a gap at an air inflow end of the head slider, a gap at an air outflow end of the head slider and a gap at the projection;

FIGS. 18(a) to 18(k) show a manufacturing method of a head slider of a magnetic head according to the fourteenth embodiment of the present invention;

DETAIL DESCRIPTION OF THE EMBODIMENTS

The First Embodiment

Preferred embodiments according to the first concept of the present invention are first described with reference to drawings to solve the first object.

Figure 1A:
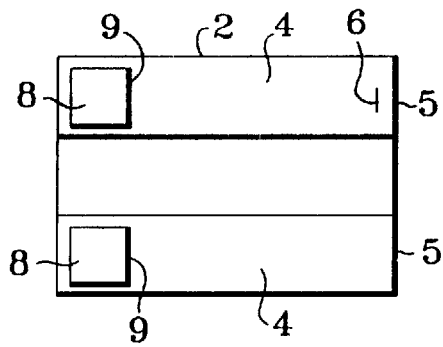
FIG. 1(a) is a schematic plan view of a magnetic head slider according to the first embodiment of the present invention.
Figure 1B:
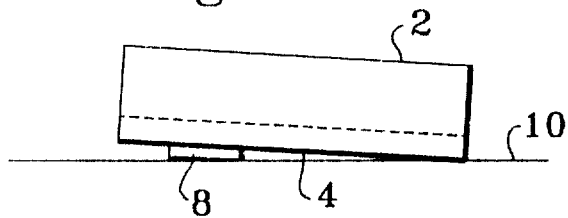
FIG. 1(b) is a schematic side view of the magnetic head slider shown in FIG. 1(a)

FIG. 1(a) is a schematic plan view of a magnetic head slider according to the first embodiment of the present invention. FIG. 1(b) is a schematic side view of the magnetic head slider shown in FIG. 1(a).

As shown in FIG. 1(a), a pair of rail planes 4 respectively having a flat rail surface are placed on both sides of a magnetic head slider 2 to form a concave portion between the rail planes 4. A magnetic transducer (or a head device) 6 is attached on an air outflow end (or the trailing edge of the head slider 2) of one rail plane 4 from which an air flow is output, and a pair of projections 8 formed of rectangular-shaped thin films are arranged on the rail planes 4 near an air inflow end (or the loading edge of the head slider 2) from which the air flow is input. Each of the projections 8 is made of a hard material film such as a diamond-like carbon (DLC) or the like. The projections 8 are formed on the rail planes 4 according to a thin-film process through a SiC adhesive layer having a thickness of 5 nm or less. It is appropriate that the height of the projections 8 is about 30 nm because an adverse influence is not exerted on the flying of the head slider 2.

In the above configuration of the magnetic head slider 2, as shown in FIG. 1(b), the head slider 2 makes contact with a surface of a magnetic disk 10 at an outflow end edge 5 of the rail planes 4 and a rear end edge 9 of the projections 8. Because the projections 8 are arranged on the air inflow end side of the rail planes 4, when the magnetic disk is not rotated, the rear end edges 9 of the projections 8 and the outflow end edge 5 of the rail planes 4 are in contact with the magnetic disk 10. Here, stiction functioning between two surfaces contacting each other through a liquid layer (or a lubricant layer) is weakened as a contact area of the surfaces becomes smaller.

Therefore, because a contact area between the magnetic disk 10 and the head slider 2 is made small as compared with that in a conventional head slider in which all of rail planes of the slider are in contact with a magnetic disk, strength of stiction between the head slider 2 and the magnetic disk 10 is considerably reduced, the stiction of the head slider 2 to the magnetic disk 10 can be effectively reduced.

Also, as shown in FIG. 1(b), because a portion of the head slider 2 placed on the front side (or the leading edge) is raised from the magnetic disk 10 when the magnetic disk 10 is not rotated, the head slider 2 can be easily lifted up when the rotation of the magnetic disk 10 is started. Therefore, a slipping distance between the magnetic disk 10 and the head slider 2 is shortened because the head slider 2 is quickly lifted up when the rotation of the magnetic disk 10 is started, and the abrasion of the magnetic disk 10 abraded by the head slider 2 along the slipping distance can be extremely reduced.

Next, a manufacturing method of the magnetic head slider 2 is described with reference to FIGS. 2 and 3.

As shown in FIG. 3(a), a plurality of magnetic transducers 6 are arranged on a wafer 20, and an $Al_2O_3$—TiC substrate 12 formed in a rod shape is cut out from the wafer 20. A series of magnetic transducers 6 is arranged in the substrate 12.

Figure 2A:
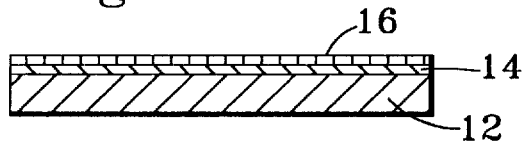
FIGS. 2(a) to 2(h) show a manufacturing method of the magnetic head slider shown in FIG. 1(a) and 1(b)

Thereafter, as shown in FIG. 2(a), an adhesive layer 14 made of SiC is formed on the substrate 12 with a thickness of about 2 nm according to a spattering technique. Thereafter, a diamond-like carbon (DLC) layer 16 is formed on the adhesive layer 14 with a thickness of about 30 nm according to a plasma chemical vapor deposition (CVD) method. The adhesive layer (or SiC layer) 14 functions as an insulating protective layer for the magnetic transducer 6 and an adhesive material for the DLC layer 16.

Figure 2B:
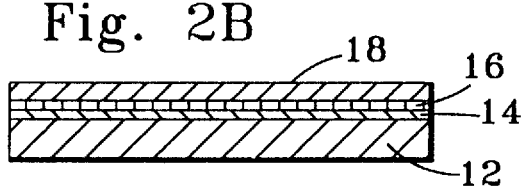
Figure 2C:
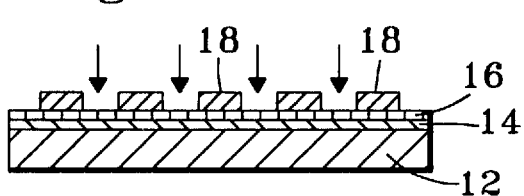
Figure 2D:
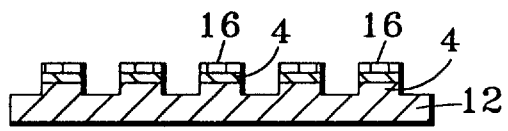

Thereafter, as shown in FIG. 2(b), a photoresist 18 is coated on the DLC layer 16, and the photoresist 18 is exposed through a photo mask having a prescribed pattern and is developed to transfer the prescribed pattern to the photoresist 18. Therefore, as shown in FIG. 2(c), the patterned photoresist layers 18 are formed by removing parts of the photoresist 18. Thereafter, the DLC layer 16, the SiC layer 14 and the substrate 12 are etched in the prescribed pattern according to an ion milling technique. Therefore, as shown in FIG. 2(d), a plurality of rail planes 4 arranged in series are formed by removing the patterned photoresist layers 18. An oblique view of the rail planes 4 is shown in FIG. 3(b).

Figure 2E:
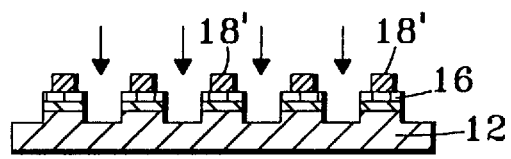
Figure 2F:
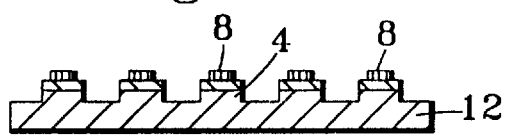

Thereafter, a photoresist 18' is coated on the etched DLC layer 16, and the photoresist 18' is exposed through another photo mask having a projection pattern and is developed to transfer the projection pattern to the photoresist 18'. Therefore, as shown in FIG. 2(e), the patterned photoresist layers 18' are formed by removing parts of the photoresists 18'. Thereafter, the DLC layer 16 is etched in the projection pattern according to the plasma etching. Therefore, as shown in FIG. 2(f), a plurality of projections 8 having the projection pattern are formed by removing the patterned photoresist layers 18'. An oblique view of the series of projections 8 formed on the rail planes 4 is shown in FIG. 3(c).

Figure 2G:
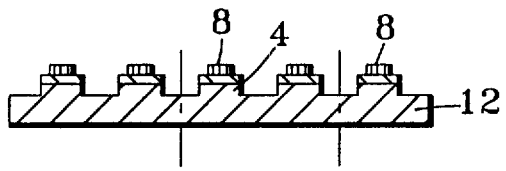
Figure 2H:
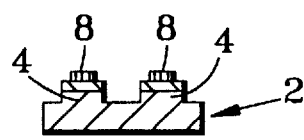

Thereafter, as shown in FIG. 2(g), the substrate 12 is cut off along dot-dash-lines to form a plurality of head sliders 2 respectively having a pair of rail planes 4. Therefore, as shown in FIG. 2(h), the magnetic head slider 2 can be obtained. An oblique view of the head slider 2 is shown in FIG. 3(d).

In the first embodiment, the DLC film formed according to the plasma CVD method is adopted as the material of the projections 8. However, an amorphous carbon film such as a carbon film, a carbon hydroxide film, a silicon-added carbon film or the like, formed according to a spattering method, can be adopted in place of the DLC film. The rigidity of the amorphous carbon film is very high, and a wear and abrasion resistance of the amorphous carbon film is sufficient to resist the abrasion and vibration occurring between the head slider 2 and the magnetic disk 10 when the rotation of the magnetic disk 10 is stopped. Also, the amorphous carbon film is used for a protective film of the magnetic disk 10, and the amorphous carbon film is appropriate as the material of the projections 8.

Also, it is applicable that an oxide thin film such as an $SiO_2$ film, an $Al_2O_3$ film or the like be adopted as the material of the projections 8 formed on the rail planes 4. Because these materials resist the abrasion and vibration occurring between the head slider 2 and the magnetic disk 10.

The Second Embodiment

FIG. 4(a) is a schematic plan view of a magnetic head slider according to the second embodiment of the present invention. FIG. 4(b) is a schematic side view of the magnetic head slider shown in FIG. 4(a).

Elements in the second embodiment and following embodiments which are the same as those in the first embodiment are denoted by the same reference numerals as those in the first embodiment, and the description of the same elements is omitted to avoid a duplicate description.

As shown in FIGS. 4(a) and 4(b), corners of the rail planes 4 placed on the air inflow end side of the rail planes 4 are cut off in a taper shape to form taper surfaces 7 on the air inflow end side of the rail planes 4. In the above configuration, an airflow input from the air inflow end side is not disturbed by any corner of the rail planes 4 but smoothly passes along the taper surfaces 7 to give a floating force to the head slider 2. Therefore, any adverse influence exerted on the flying of the head slider 2 can be avoided, and the head slider 2 can stably fly over the surface of the magnetic disk 10 during the rotation of the magnetic disk 10.

The Third Embodiment

FIG. 5(a) is a schematic plan view of a magnetic head slider according to the third embodiment of the present invention. FIG. 5(b) is a schematic side view of the magnetic head slider shown in FIG. 5(a).

As shown in FIGS. 5(a) and 5(b), the taper surfaces 7 are formed on the air inflow end side, and a pair of projections 8a are arranged on boundary areas ranging from the taper surfaces 7 to the rail planes 4, in place of the projections 8. Because parts of the projections 8a are arranged along the taper surfaces 7, an airflow input from the air inflow end side is not disturbed by side surfaces of the projections 8a but smoothly passes along surfaces of the projections 8a facing the magnetic disk 10. Therefore, any adverse influence exerted on the flying of the head slider 2 can be avoided, and the head slider 2 can more stably fly over the surface of the magnetic disk 10 during the rotation of the magnetic disk 10.

Because the projections 8a are formed to have a taper part as mentioned above, a front part of the projections 8a do not catch on the magnetic disk 10 at a start or a stop of rotation of the magnetic disk 10, thus reducing the wearing of the projections 8a.

The Fourth Embodiment

FIG. 6(a) is a schematic plan view of a magnetic head slider according to the fourth embodiment of the present invention. FIG. 6(b) is a schematic side view of the magnetic head slider shown in FIG. 6(a).

As shown in FIGS. 6(a) and 6(b), a pair of projections 8b formed in a cylindrical shape are arranged on the air inflow end side of the rail planes 4, in place of the projections 8 formed in a rectangular shape.

Because the projections 8b are formed in the cylindrical shape, they do not collect a lot of dust when running on the surface of the magnetic disk 10, as compared with a case when the projections 8b are formed in a cubic shape.

The Fifth Embodiment

Figure 7A:
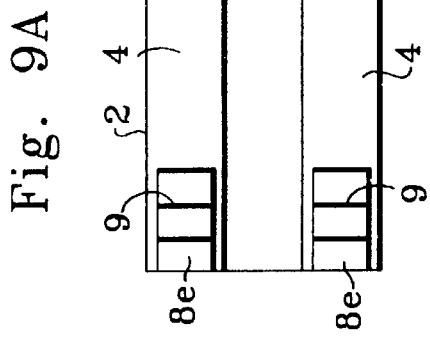
FIG. 7(a) is a schematic plan view of a magnetic head slider according to the fifth embodiment of the present invention.
Figure 7B:
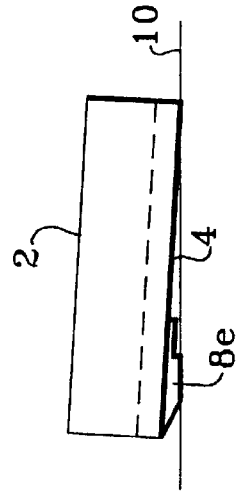
FIG. 7(b) is a schematic side view of the magnetic head slider shown in FIG. 7(a)

FIG. 7(a) is a schematic plan view of a magnetic head slider according to the fifth embodiment of the present invention. FIG. 7(b) is a schematic side view of the magnetic head slider shown in FIG. 7(a).

As shown in FIGS. 7(a) and 7(b), a pair of projections 8c respectively formed of a part of spherical body are arranged on the air inflow end side of the rail planes 4, in place of the projections 8. Because the projections 8c are formed in an almost hemispherical shape, each of the projections 8c makes contact with the magnetic disk 10 at a point 11. Therefore, a contact area between the head slider 2 and the magnetic disk 10 can be made smaller than those in the first to fourth embodiments in which the rectangular or cylindrical projections are used. Accordingly, the strength of the stiction between the head slider 12 and the magnetic disk 10 can be further reduced.

The Sixth Embodiment

Figure 8A:
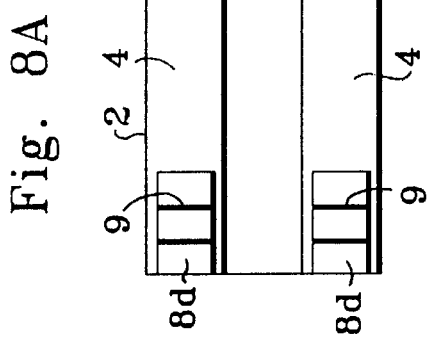
FIG. 8(a) is a schematic plan view of a magnetic head slider according to the sixth embodiment of the present invention.
Figure 8B:
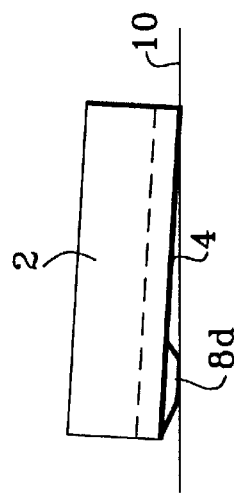
FIG. 8(b) is a schematic side view of the magnetic head slider shown in FIG. 8(a)

FIG. 8(a) is a schematic plan view of a magnetic head slider according to the sixth embodiment of the present invention. FIG. 8(b) is a schematic side view of the magnetic head slider shown in FIG. 8(a).

As shown in FIGS. 8(a) and 8(b), a pair of projections 8d, in which side surfaces on the front side of the head slider 2 are etched in a taper shape and other side surfaces on the rear side of the head slider 2 are etched in the same taper shape, are arranged in place of the projections 8. That is, each of the projections 8d has a pair of taper portions on its front and rear sides, and a cross-sectional area at a bottom portion of the projection 8d is larger than that at a top portion c of the projection 8d.

Because the side surfaces of the projections 8d on the rear side of the head slider 2 are etched, the height of the projections 8d contacting with the magnetic disk 10 is lowered, and an adverse influence of the height of the projections 8d on the flying of the head slider 2 can be avoided.

The Seventh Embodiment

Figure 9A:
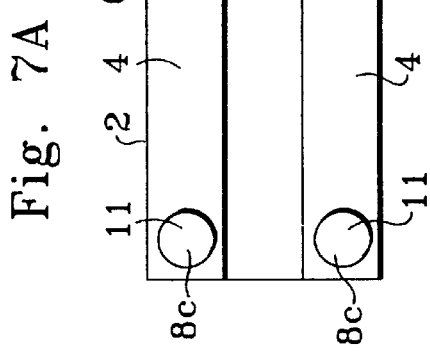
FIG. 9(a) is a schematic plan view of a magnetic head slider according to the seventh embodiment of the present invention.
Figure 9B:
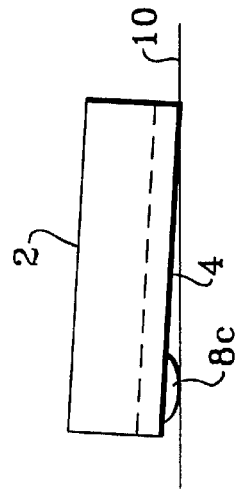
FIG. 9(b) is a schematic side view of the magnetic head slider shown in FIG. 9(a)

FIG. 9(a) is a schematic plan view of a magnetic head slider according to the seventh embodiment of the present invention. FIG. 9(b) is a schematic side view of the magnetic head slider shown in FIG. 9(a).

As shown in FIGS. 9(a) and 9(b), a pair of projections 8e are respectively formed of a plurality of films, in place of the projections 8. A rear end portion 9 of each of the projections 8e is formed in a step-wise shape to arrange a step portion on a rear side of the projection 8e. Therefore, the height of the projections 8e contacting with the magnetic disk 10 is lowered, and an adverse influence of the height of the projections 8e on the flying of the head slider 2 can be avoided, in the same manner as in the sixth embodiment.

A group of projections 8d and a group of projections 8e are respectively formed according to a single thin-film processing after the rail 4 planes are formed. Therefore, a manufacturing process of the head slider 2 can be simplified.

The Eighth Embodiment

Figure 10A:
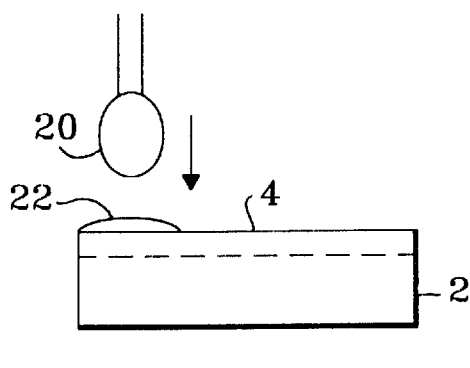
FIGS. 10(a) to 10(c) show a manufacturing method of a pair of projections according to the eighth embodiment.
Figure 10B:
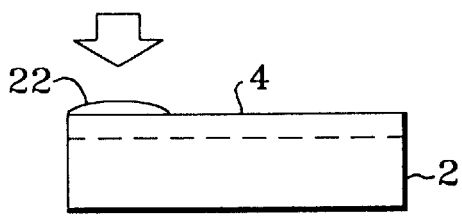
Figure 10C:
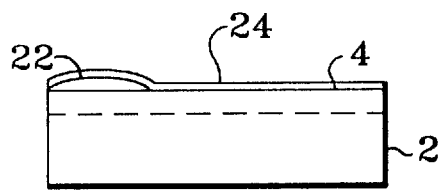

FIGS. 10(a) to 10(c) show a manufacturing process of a pair of projections according to the eighth embodiment of the present invention. In the eighth embodiment, a pair of projections arranged on the rail planes 4 are respectively made of a resist film having a low coefficient of viscosity.

In cases where a pair of projections, for example, respectively formed in a partial spherical form are arranged on the rail planes 4, after the rail planes 4 are formed, as shown in FIG. 10(a), a pair of small droplets 20 respectively made of a resist having a low coefficient of viscosity are dropped on portions of the rail planes 4 placed on the air inflow end side of the head slider 2 to form a pair of resist layers 22. In this case, the resist layers 22 are respectively formed in an almost hemispherical shape because of a surface intention of the resist.

Thereafter, as shown in FIG. 10(b), ultraviolet light is radiated to the resist layers 22 or the resist layers 22 are heated to harden the resist layers 22 according to a property of the resist. Therefore, the projections 22 made of the hardened resist are arranged on the rail planes 4. Accordingly, a projection forming process can be simplified.

In this embodiment, to improve the durability of the projections 22, as shown in FIG. 10(c), a protective film 24 made of the diamond-like carbon is formed over the entire rail planes 4 according to the plasma CVD method in thicknesses ranging from 10 to 20 nm to protect the projections 22. In a modification of this embodiment, it is applicable that the protective film 24 be limitedly formed on the projections 22. Also, it is applicable that the protective film 24 be made of an amorphous carbon film such as a carbon film, a carbon hydroxide film, a silicon-added carbon film or the like formed according to a spattering method. Also, it is applicable that the protective film 24 be made of an oxide thin film such as an $SiO_2$ film, an $Al_2O_3$ film or the like.

The Ninth Embodiment

Figure 11A:
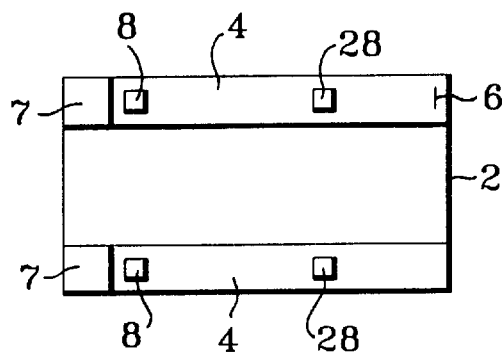
FIG. 11(a) is a schematic plan view of a magnetic head slider according to the ninth embodiment of the present invention.
Figure 11B:
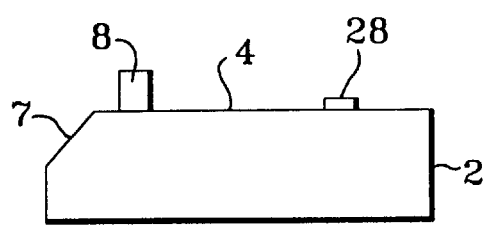
FIG. 11(b) is a schematic side view of the magnetic head slider shown in FIG. 11(a)

FIG. 11(a) is a schematic plan view of a magnetic head slider according to the ninth embodiment of the present invention. FIG. 11(b) is a schematic side view of the magnetic head slider shown in FIG. 11(a).

In the ninth embodiment, as shown in FIGS. 11(a) and 11(b), the taper surfaces 7 and the projections 8 are arranged in the same manner as in the second embodiment. In addition to the projections 8 arranged on the air inflow end side of the rail planes 4, a pair of projections 28 are arranged on the air outflow end side of the rail planes 4. A height of the projection 28 is lower than that of the projection 8.

In this case, while the projections 8 near the air inflow end are higher than the other projections 28, only projections 8 and 28 reliably come into contact with the magnetic disk in spite that the surface of the head slider is somewhat uneven. As a result, the stiction between the head slider and the magnetic disk does not increase. In addition, even though the projections 28 are formed in a region where the head slider is very close to the disk surface, since the height of the projections are very small, the projections 28 do not cause difficulties for the head slider to be lifted up.

Figure 12:
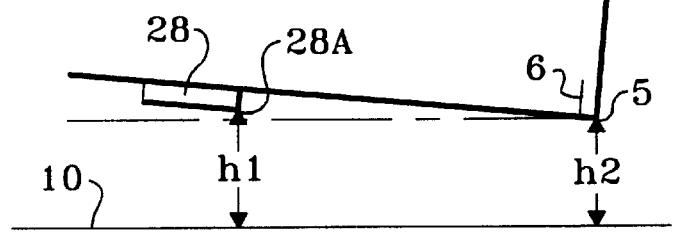
FIG. 12 shows a relationship of a gap at projections and another gap at an air outflow end of the head slider.

By referring to FIG. 12, a relationship of a gap at the projections 28 and another gap at an air outflow end of the head slider 2 is described. A thickness (or a height) of the projection 28 and a position of the projection 28 are determined to set a gap (or a flying height) between the air outflow end of the head slider 2 and the surface of the magnetic disk 10 to a value h2 lower than another gap h1 (or a flying height) between the projection 28 and the surface of the magnetic disk 10 when the head slider 2 flies over the magnetic disk 10. Because the gap h2 is lower than the gap h1, even though the projections are arranged near to the magnetic transducer 6, a read-write distance between the magnetic transducer 6 and the magnetic disk 10 can be sufficiently made small to reliably read or write information from/in the magnetic disk 10. That is, any adverse influence of the projections 28 on the magnetic transducer 6 can be avoided.

The Tenth Embodiment

FIG. 13(a) is a schematic plan view of a magnetic head slider according to the tenth embodiment of the present invention. FIG. 13(b) is a schematic side view of the magnetic head slider shown in FIG. 13(a).

In the tenth embodiment shown in FIGS. 13(a) and 13(b), each of the projections 8a is arranged on a flying region ranging from an air inflow end of the rail plane 4 to the taper surface 7, in the same manner as in the third embodiment shown in FIG. 5. In addition, the projections 28 are arranged on the rail planes 4 in the same manner as in the ninth embodiment. A height of the projection 28 is lower than that of the projection 8a.

The head slider according to the 13th embodiment has a structure in which structures shown in FIGS. 5 and 11 are combined.

The 11th Embodiment

FIG. 14(a) is a schematic plan view of a magnetic head slider according to the eleventh embodiment of the present invention. FIG. 14(b) is a schematic side view of the magnetic head slider shown in FIG. 14(a).

As shown in FIGS. 14(a) and 14(b), the taper surfaces 7 are arranged in the same manner as in the second embodiment. Also, a pair of projections 30 respectively formed in a cylindrical shape are arranged on generally central portions of the rail planes 4, in place of the projections 8.

Because the projections 30 are arranged on the generally central portions of the rail planes 4, when the rotation of the magnetic disk 10 is stopped, the projections 30 immediately make contact with the magnetic disk 10 regardless of a posture of the head slider 2. Therefore, the head slider 2 put on the magnetic disk 10 can reliably maintain its stable posture in its early stages. Also, because the head slider 2 put on the magnetic disk 10 is supported by only the two projections 30, a contact area between the head slider 2 and the magnetic disk 10 can be reduced, and a strength of the stiction between the head slider 2 and the magnetic disk 10 can be made small. The height of the projection 30 is appropriate to be about 30 nm.

A relationship of a gap at an air inflow end of the head slider 2, a gap at an air outflow end of the head slider 2 and a gap at the projection 30 is described with reference to FIG. 15.

As shown in FIG. 15, when the head slider 2 is set in a flying condition, the first gap H1 between the air inflow end of the head slider 2 and the surface of the magnetic disk 10 is larger than the second gap H2 between the air outflow end of the head slider 2 and the surface of the magnetic disk 10. Also, a thin film T1 of the projection 30 is determined on condition that the third gap H3 between the projection 30 and the surface of the magnetic disk 10 is sufficiently large not to generate a spacing loss. In other words, the thin film T1 is determined on condition that H2<H3 is satisfied.

The 12th Embodiment

Figure 16A:
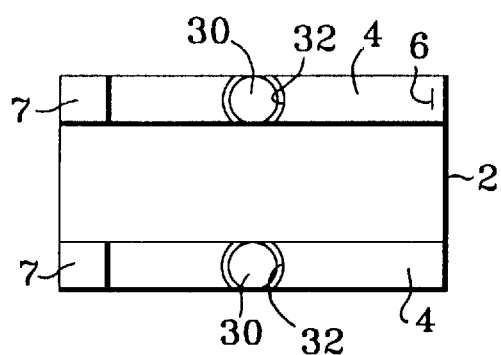
FIG. 16(a) is a schematic plan view of a magnetic head slider according to the twelfth embodiment of the present invention.
Figure 16B:
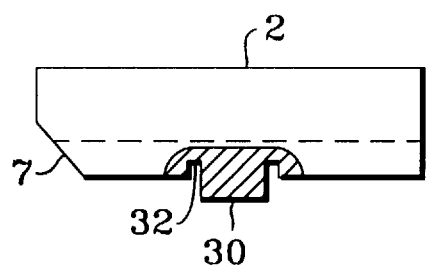
FIG. 16(b) is a schematic side view of the magnetic head slider shown in FIG. 16(a)

FIG. 16(a) is a schematic plan view of a magnetic head slider according to the twelfth embodiment of the present invention. FIG. 16(b) is a schematic side view of the magnetic head slider shown in FIG. 16(a).

In the twelfth embodiment shown in FIGS. 16(a) and 16(b), the taper surfaces 7 and the projections 30 are arranged in the same manner as in the eleventh embodiment. In addition, a pair of grooves 32 are arranged to surround the projections 30. That is, the grooves 32 are formed on both air inflow and outflow sides of the projections 30. A width of the groove 32 is about 2 m, and a depth of the groove 32 is about 20 nm.

To reduce the strength of the stiction between the head slider 2 and the magnetic disk 10, it is effective to coat the surface of the magnetic disk 10 with a lubricant. However, when the magnetic disk 10 is rotated at a high speed, the lubricant coated on the surface of the magnetic disk 10 is undesirably scattered. In this embodiment, the scattered lubricant is caught by the projections 30 and is held in the grooves 32. Therefore, even though the head slider 2 is operated according to the contact stop start (CSS) method, the surface of the magnetic disk 10 can be coated with the lubricant without any trouble, and the strength of the stiction can be reduced. The depth and width of the groove 32 can be appropriately changed on condition that the stiction can be effectively reduced.

The 13th Embodiment

Figure 17A:
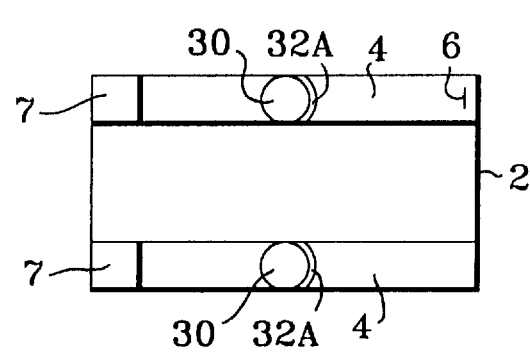
FIG. 17(a) is a schematic plan view of a magnetic head slider according to the thirteenth embodiment of the present invention.
Figure 17B:
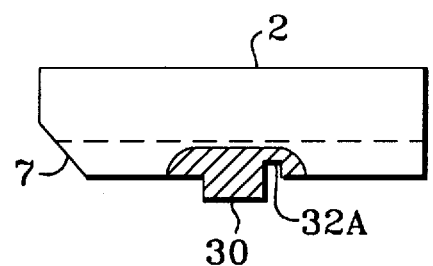
FIG. 17(b) is a schematic side view of the magnetic head slider shown in FIG. 17(a)

FIG. 17(a) is a schematic plan view of a magnetic head slider according to the thirteenth embodiment of the present invention. FIG. 17(b) is a schematic side view of the magnetic head slider shown in FIG. 17(a).

In the thirteenth embodiment shown in FIGS. 17(a) and 17(b), the taper surfaces 7 and the projections 30 are arranged in the same manner as in the eleventh embodiment. In addition, a pair of grooves 32' are limitedly arranged on the air outflow side of the projections 30. In the above configuration, the scattered lubricant is caught by the projections 30 and is moved into the grooves 32a by the airflow. Accordingly, the scattered lubricant can be effectively caught and held in the grooves 32a.

Next, preferred embodiments according to the second concept of the present invention are described with reference to drawings to solve the second object.

The 14th Embodiment

FIGS. 18(a) to 18(k) show a manufacturing method of a head slider of a magnetic head according to the fourteenth embodiment of the present invention.

Figure 18A:
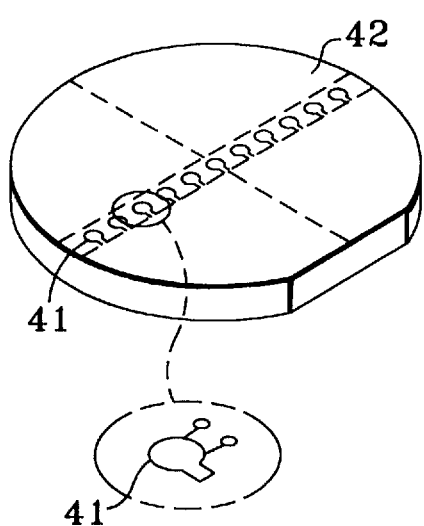
Figure 18B:
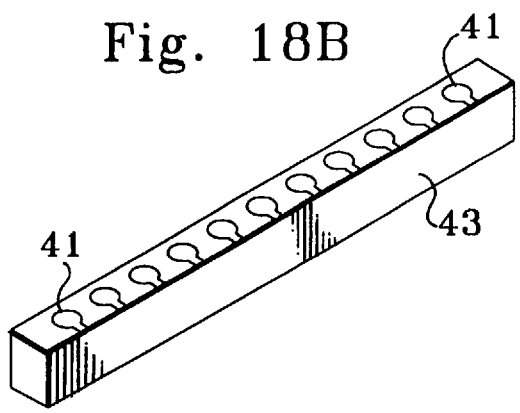

As shown in FIG. 18(a), a plurality of magnetic transducers 41 are formed longitudinally and laterally on a main surface of a wafer 42 made of a material such as alumina titanium carbide ($Al_2O_3TiC$), ferrite, calcium titanate or the like. The magnetic transducer 41 is formed of a magneto-resistance effect device, an inductance device or the like and is connected to a pair of terminals. Thereafter, the wafer 42 is cut with a dicing saw along dotted lines shown in FIG. 18(a) to divide the wafer 42 into a plurality of rods 43. Therefore, as shown in FIG. 18(b), the plurality of rods 43 respectively having a plurality of magnetic transducers 41 arranged in series are obtained from the wafer 42. Because each of the rods 43 is processed to form a plurality of head sliders of magnetic heads by dividing each rod 43, a taper surface is formed on an air inflow end side of each rod 43 for an airflow in advance.

Figure 18C:
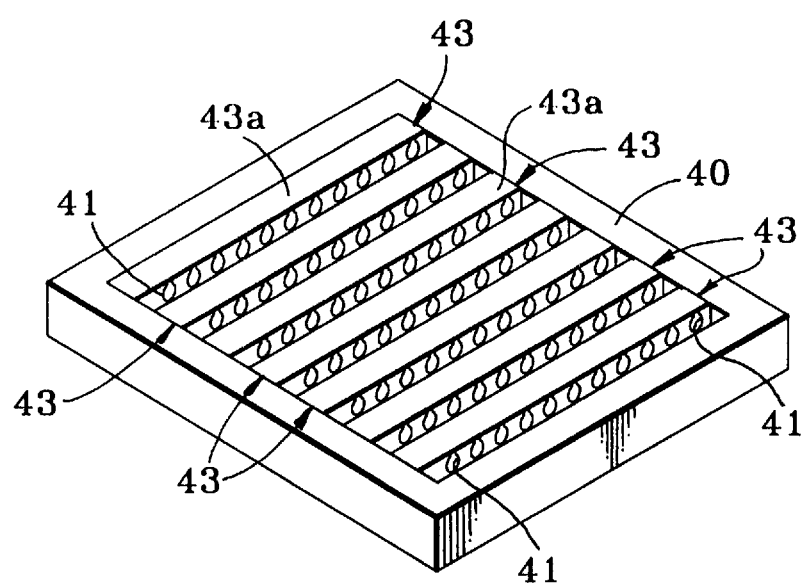

Thereafter, as shown in FIG. 18(c), a plurality of rods 43 are set on a holder 40 of which a circumferential portion is formed in a step-wise shape to fix the rods 43. In this case, a surface of each bar 43 on which the magnetic transducer 41 is arranged is turned sideways, and read and write end portions of the magnetic transducer 41 is turned upward. Therefore, a substrate plane 43a of each rod 43 on which any magnetic transducer 41 is not arranged is turned upward.

Thereafter, as shown in FIG. 18(d), an adhesive layer 44 consisting of silicon or silicon carbide is formed on the substrate plane 43a of the rod 43 with a thickness of 5 nm, a diamond-like carbon (DLC) film 45 is formed on the adhesive layer 44 with a thickness of 30 nm. The adhesive layer 44 is arranged to improve the stiction between the DLC film 45 and the rod 43. The adhesive layer 44 and the DLC film 45 are respectively formed according to a sputtering method or a chemical vapor deposition (CVD) method.

Thereafter, the first dry film resist 46 is laminated on the DLC film 45 by a laminator 47. Thereafter, the first dry film resist 46 is exposed to ultra-violet light through a photomask (not shown) and is developed according to a photo-lithography to transfer a prescribed pattern of the photomask to the first dry film resist 46. Therefore, as shown in FIG. 18(e), when parts of the first dry film resist 46 are removed, patterned first dry film resists remain on the DLC film 45. The patterned first dry film resists 46 are respectively formed in a circular shape. In this embodiment, the patterned first dry film resist 46 is formed in the circular shape. However, it is applicable that the patterned first dry film resist 46 be formed in an elliptic shape, a parabolic shape or the like on condition that an airflow is not disturbed by the patterned first dry film resists 46 when a head slider of the magnetic head flies. The patterned first dry film resists 46 are used as the first mask to form a plurality of projections, and the projections of the magnetic head contact with a magnetic disk.

Thereafter, as shown in FIG. 18(f), the DLC film 45 exposed between the patterned first dry film resists 46 are etched by oxygen plasma according to a patterning process to form a plurality of patterned DLC films 45. The patterned DLC films 45 are used as a plurality of projections 45a arranged on a head slider. Therefore, a height of the projection 45a is equal to that of the patterned DLC film 45. In this patterning process, because an etching rate of the adhesive layer 44 etched by the oxygen plasma is very low or substantially equal to zero, the adhesive layer 44 remains on the rod 43 without being etched. Accordingly, an etching depth of the patterned DLC film 45 can be easily adjusted. That is, the height of the projection 45a can be arbitrarily adjusted.

Thereafter, as shown in FIG. 18(g), the second dry film resist 48 is laminated over the entire rod 43 by the laminator 47. Therefore, the patterned first dry film resists 46, the projections 45a and the adhesive layer 44 are covered with the second dry film resist 48. Thereafter, the second dry film resist 48 are exposed to ultra-violet light and is developed according to a photo-lithography. Thereafter, as shown in FIG. 18(h), a plurality of windows 48a which each are formed in a stripe shape and extend in a width direction of the rod 43 perpendicular to a longitudinal direction of the rod 43 are formed on both sides of the magnetic transducers 41 by removing parts of the second dry film resist 48. Therefore, patterned second dry film resists 48 respectively formed in a stripe shape remain in first regions which each extend over the magnetic transducer 41 in the width direction of the rod 43 and second regions which each are placed between the first regions and extend in the width direction of the rod 43. That is, the first and second regions of the rod 43 are alternately placed through the windows 48a, and the projection 45a is arranged in each of the first and second regions.

Thereafter, the patterned second dry film resists 48 formed in the stripe shape are used as the second mask, and the adhesive layer 44 and the substrate plane 43a of the rod 43 are etched using the windows 48a of the second mask according to an ion milling technique to form a plurality of concave portions 49. Therefore, as shown in FIG. 18(i), the substrate plane 45a remaining in the first regions and the second regions is divided into a plurality of patterned substrate planes respectively formed in a convex shape by the concave portions 49. A plurality of rail planes 43b are formed of the patterned substrate planes placed on both sides of the concave portions 49 or a plurality of patterned intermediate layers 44 placed on the patterned substrate planes.

Thereafter, as shown in FIG. 18(j), after the patterned first and second dry film resists 46 and 48 are removed, a protective film 50 made of a material such as a diamond-like carbon, $SiO_2$, $Al_2O_3$ or the like is formed over the entire rod 43 according to a sputtering process or a CVD process to cover a surface of the rod 43, on which the projections 45a are formed. In this case, it is applicable that an adhesive layer such as a silicon film or a silicon carbide film be formed under the protective film 50 to improve the adhesion of the protective film 50 to the rod 43. The protective film 50 has a function to protect a plurality of portions of the transducers 41 attached on the rail planes 43b and another function to prevent the patterned adhesive layers 44 placed at the outer most surfaces of the rail planes 43b from being contaminated by contaminators. As the contaminators, lubricant scattered from the magnetic disk rotated, carbon occurring from the projections 45a and the like are known.

Thereafter, as shown in FIG. 18(k), the rod 43 is divided into a plurality of head sliders 51 of magnetic heads by cutting the concave portions 49 with a dicing saw every other row.

As is described above, because the DLC film 45 is patterned according to the photo-lithography, and the patterned DLC films 45a are used as the projections 45a. Therefore, the projections 45a can be easily formed, and the size and positions of the projections 45a can be precisely determined.

Also, because the first dry film resist 46 of which a film thickness is constant over the entire rod 43 is used as a mask to form the projections 45a, the projections 45a can be produced at the same size with a high accuracy, and the mass productivity of the projection 45a can be improved. For example, in cases where liquid resist is used in place of the film resist 46, the deviation of the film thickness of the liquid resist formed over the entire rod 43 is increased, a pattern accuracy of patterned liquid resist after the exposing and developing processes deteriorates, and the size accuracy of the projections 45a deteriorates.

Also, in this embodiment, after the projections 45a are formed on the rail planes 43b, the concave portions 49 are formed at regions far from the projections 45a. Therefore, the second dry film resist 48 can be laminated on the patterned first dry film resists 46 without removing the patterned first dry film resists 46. That is, only one removing process is required to remove the two types of film resists 46 and 48. Accordingly, the manufacturing process of the head slider 51 can be simplified.

Figure 19A:
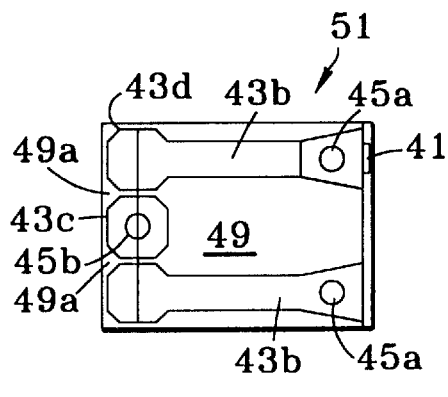
FIG. 19(a) is a plan view of a head slider manufactured according to the manufacturing method.
Figure 19B:
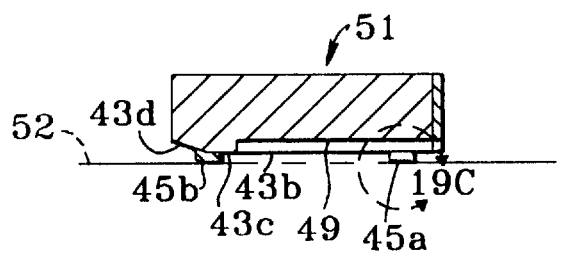
FIG. 19(b) is a side view of the head slider shown in FIG. 19(a)
Figure 19C:
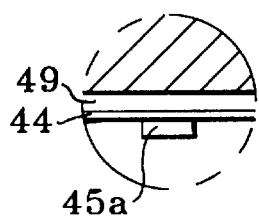

FIG. 19(a) is a plan view of the head slider 51 manufactured according to the manufacturing method, and FIG. 19(b) is a side view of the head slider 51 shown in FIG. 19(a). In FIGS. 19(a) and 19(b), the protective film 50 placed on the rail planes 43b and the rod 43 is omitted.

As shown in FIGS. 19(a) and 19(b), a pair of rail planes 43b respectively formed in a generally stripe shape are arranged in relief on a surface of the head slider 51 facing a magnetic disk (or a magnetic recording medium) 52 along both end sides of the surface from an air inflow end side to an air outflow end side, and a rail plane 43c formed in an island shape is arranged on the air inflow side of the concave portion 49 placed between the stripe-shaped rail planes 43b. The rail plane 43c is cut at its air inflow end in a taper shape to form a taper surface 43d. An airflow smoothly passes along the taper surface 43d to give a floating force to the head slider 51.

Also, a pair of projections 45a are arranged on the air outflow end side of the stripe-shaped rail planes 43b, and a projection 45b is arranged on the island-shaped real plane 43c. Because the three projections 45a and 45b are arranged at three corners of a triangle, when the rotation of the magnetic disk 52 is stopped, the head slider 51 can be stably set on the magnetic disk 52 without influence by the flatness of the rail plane of the head slider. Here, the three projections 45a and 45b are simultaneously formed in the same process, and the rail planes 43b and 43c are simultaneously formed in the same process as is described in the manufacturing method of the head slider 51.

Because three projections exist, the contact between the three projections 45a and 45b and the magnetic disk is stabilized.

Therefore, the stiction between the magnetic disk 52 and the head slider 51 can be stabilized, and a stating operation of a magnetic recording drive composed of the head slider 51, the magnetic transducer 41 and the magnetic disk 52 can be smoothly performed.

In this embodiment, in order to ensure enough floating stability of the floating type head slider when seeking, two rail planes 43b are formed near the air outflow end and projections 45a are formed on the respective rail planes 43b.

In addition, the head slider of this embodiment has slits 49a, by which the rail plane is divided into three parts, near the air inflow end. These slits 49a are connected with each other through the concave part 49. According to this structure, the air through the slits expand at the concave part 49 on a plane of the head slider, the plane which is opposite to the magnetic disc 52. As a result, a negative air pressure is produced at the concave part 49. This pressure works to suppress the lifting of the head slider. Accordingly, by providing a negative air pressure area (the concave part 49) to the head slider, the floating stability is improved and the loading force applied on the head slider can be reduced. Because the loading force is reduced, forces applied on the three projections become small on the magnetic disk, thus greatly reducing the wearing of the projections.

Also, because the projection 45b placed on the air inflow end side of the slider 51 is gently bent in a thickness direction of the slider 51 along the taper plane 43d, there is no probability that an edge of the projection 45b having an acute angle contacts with the magnetic disk 52. Therefore, there is no probability that the surface of the magnetic disk 52 is damaged.

Figure 21:
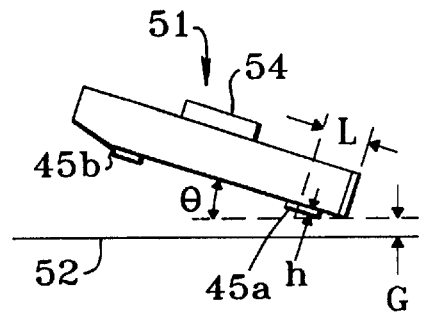
FIG. 21 shows a posture of the head slider shown in FIGS. 19(a) and 19(b) in a flying condition.

Next, a flying attitude of the head slider 51 in a flying condition is described with reference to FIG. 21.

The first flying height between the projection 45a placed near the air outflow end of the head slider 51 and the surface of the magnetic disk 52 is larger than the second flying height G between the magnetic transducer 41 (or the head slider 51 at the air outflow end) and the surface of the magnetic disk 52.

The inclining angle θ of the head slider during floating determines the height h of the projections 45a near the air outflow end and the distance L from the transducer 41.

Also, though a contact area between the head slider 51 and the magnetic disk 52 is reduced because the projections 45a are arranged on the rail planes 43b, a contact pressure between the head slider 51 and the magnetic disk 52 at the contact area is increased. Therefore, the abrasion of the projections 45a and the magnetic disk 52 at the contact area is increased. Therefore, a loading force of the head slider 51 to the magnetic disk 52 by the supporting spring 54 is lightened to 2 gf or less, preferably 1 gf or less.

The force from the load pressing on the head slider 51 is placed in a region surrounded by the three projections 45a and 45b.

Also, to reduce the loading force, a weight of the head slider 43 including the magnetic transducer 41 is set to 6 mg or less or is preferably set to 2 mg or less. Also, to reduce the loading force applied to the head slider 51 by the supporting spring 54, it is advantageous to generate a negative pressure. For example, as shown in FIGS. 19(a) and 19(b), the negative pressure portion is placed on the air outflow end side of the narrow slits 49a.

To reliably record or reproduce information in/from the magnetic disk 52, the second flying height G of the magnetic transducer 41 is set as small as possible, so that the information can be recorded in the magnetic disk 52 in a high recording density. For example, the head slider 51 has external dimensions of 1.25 mm by 1 mm by 0.3 mm and has a weight of 1.5 mg, and the projection 45a has dimensions of 66 µm in diameter by h=30 nm in height. The inclining angle θ is 0.006°, and the distance L is 350 µm. In this case, the second flying height G of the magnetic transducer 41 is set to 50 nm and is smaller than the first flying height of the projection 45a.

A length from the air inflow end to the air out flow end of the head slider 51 is 2 mm or less.

In this embodiment, a flying altitude of the head slider 51 represented by the inclination of the head slider 51, the height of the projection 45a, the distance L, the first flying height and the like are determined on condition that the three projections 45a and 45b are arranged. However, the number of projections and the arrangement of the projections are not limited to this embodiment.

Figure 20:
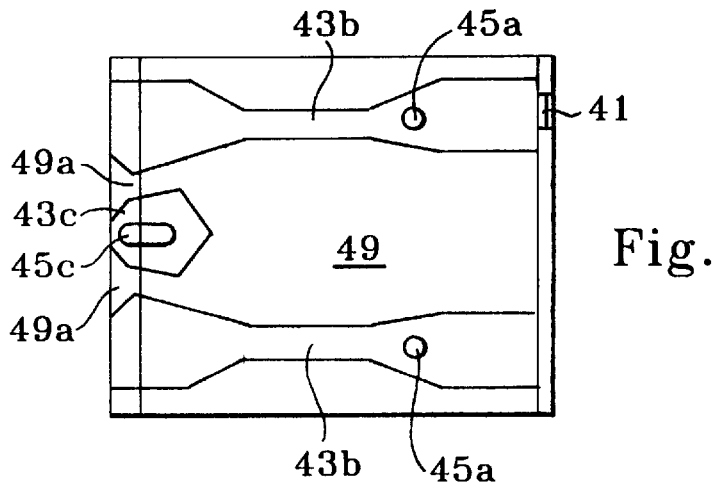
FIG. 20 is a plan view of a head slider obtained as a modification of the head slider shown in FIG. 19(a)

FIG. 20 is a plan view of a head slider obtained as a modification of the head slider 51 shown in FIG. 19(a). As shown in FIG. 20, a projection 45c of which a horizontal plane facing the magnetic disk 52 is formed in an elliptic shape is arranged on a boundary region ranging from the taper plane 43d to an air inflow end side portion of the rail plane 43b, in place of the projection 45b shown in FIG. 19(b). Therefore, the projection 45c functions in the same manner as the projection 45b.

A flat top area of the projection 45b (or 45c) near the air inflow end is smaller than the total area of the projections 45a near the air out flow end side.

The 15th Embodiment

Next, a manufacturing method of a head slider of a magnetic head according to the fifteenth embodiment of the present invention is described with reference to FIGS. 22(a) to 22(h).

The plurality of rods 43 having the magnetic transducers 41 are set and fixed on the holder 40 in the same manner as in the fourteenth embodiment shown in FIG. 18(c).

Figure 22A:
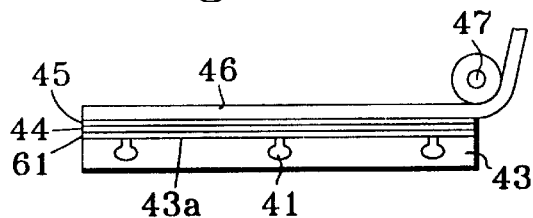
FIGS. 22(a) to 22(h) show a manufacturing method of a head slider of a magnetic head according to the fifteenth embodiment of the present invention.

Thereafter, as shown in FIG. 22(a), a protective film 61 made of a material such as a diamond-like carbon, $SiO_2$, $Al_2O_3$ or the like is formed with a thickness of 10 nm on the substrate plane 43a of each rod 43 on which any magnetic transducer 41 is not attached. Thereafter, the adhesive layer 44 is formed on the protective film 61 with a thickness of 5 nm, and the diamond-like carbon (DLC) film 45 is formed on the adhesive layer 44 with a thickness of 30 nm. The films 61, 44 and 45 are formed according to the sputtering method or the CVD method. The protective film 61 is arranged to cover and protect portions of the magnetic transducers 41 exposed to the substrate plane 43a and the rail planes 43b described hereinafter.

Figure 22B:
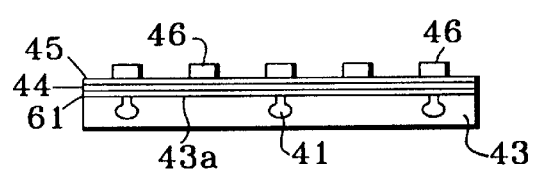

Thereafter, the first dry film resist 46 is laminated on the DLC film 44 by the laminator 47. Thereafter, the first dry film resist 46 is exposed and developed according to a photo-lithography. Therefore, as shown in FIG. 22(b), patterned first dry film resists 46 are remained on the DLC film 45. The patterned first dry film resists 46 are respectively formed in a circular shape. The patterned first dry film resists 46 are used as the first mask to form a plurality of projections, and the projections of the magnetic head contact with a magnetic disk.

Figure 22C:
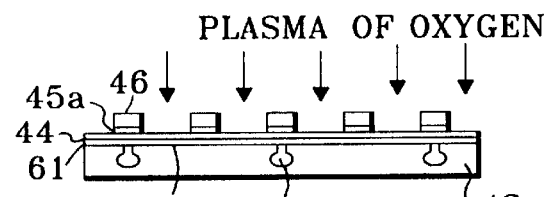

Thereafter, as shown in FIG. 22(c), the DLC film 45 exposed between the patterned first dry film resists 46 are etched by oxygen plasma to form a plurality of patterned DLC films 45. The patterned DLC films 45 are used as a plurality of projections 45a arranged on a head slider. Therefore, a height of the projection 45a is equal to that of the patterned DLC film 45. In this case, because an error in the depth of the patterned DLC film 45 etched by the oxygen plasma is about ±10 nm, it is difficult to control the height of the projection 45a by adjusting an etching time. However, the adhesive layer 44 is not etched by the oxygen plasma, the adhesive layer 44 functions as an etching stopper, and the height of the projection 45a can be arbitrarily adjusted. Also, even though the protective film 61 is made of the diamond-like carbon, the etching of the protective film 61 can be prevented because of the presence of the adhesive layer 44.

Figure 22D:
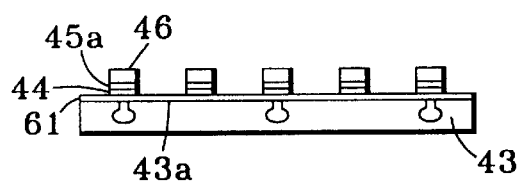

Because the adhesive layer 44 exposed around the projections 45a is easily contaminated by lubricant or carbon, it is required to remove the adhesive layer 44 exposed. Therefore, after the formation of the projections 45a, as shown in FIG. 22(d), the adhesive layer 44 exposed and not covered with the first mask 46 is etched by $CF_4$ plasma or $CF_4+O_2$ plasma and is removed. In this case, because the protective film 61 is hardly etched by the $CF_4$ plasma or $CF_4+O_2$ plasma, it is not required to control an etching depth of the adhesive layer 44, the adhesive layer 44 exposed can be easily removed, and the manufacturing method of a head slider can be simplified.

Figure 22E:
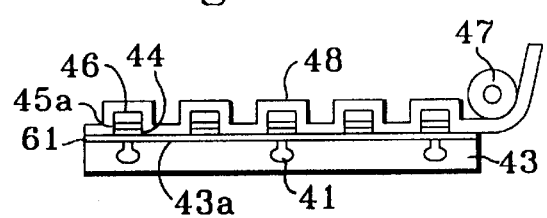
Figure 22F:
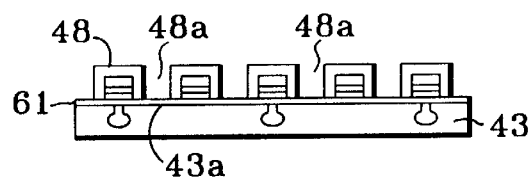

Thereafter, as shown in FIG. 22(e), the second dry film resist 48 is laminated over the entire rod 43 by the laminator 47. Therefore, the patterned first dry film resists 46, the protective film 61 and the projections 45a are covered with the second dry film resist 48. Thereafter, the second dry film resist 48 are exposed and developed according to a photolithography. Thereafter, as shown in FIG. 22(f), the plurality of windows 48a which each are formed in an almost stripe shape and extend in the width direction of the rod 43 are formed on both sides of the magnetic transducers 41 by removing parts of the second dry film resist 48. Therefore, patterned second dry film resists 48 respectively formed in a stripe shape remain in first regions which each extend over the magnetic transducer 41 in the width direction of the rod 43 and second regions which each are placed between the first regions and extend in the width direction of the rod 43. That is, the first and second regions of the rod 43 are alternately placed through the windows 48a, and the projection 45a is arranged in each of the first and second regions.

Figure 22G:
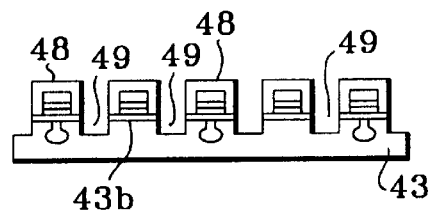

Thereafter, the patterned second dry film resists 48 formed in the stripe shape are used as the second mask, and the protective film 61 and the substrate plane 43a of the rod 43 are etched through the windows 48a of the second mask according to an ion milling technique to form the plurality of concave portions 49. Therefore, as shown in FIG. 22(g), the substrate plane 43a remaining in the first regions and the second regions is divided into a plurality of patterned substrate planes respectively formed in a convex shape by the concave portions 49. The plurality of rail planes 43b are formed of the patterned substrate planes placed on both sides of the concave portions 49 or the protective film 61 etched.

Figure 22H:
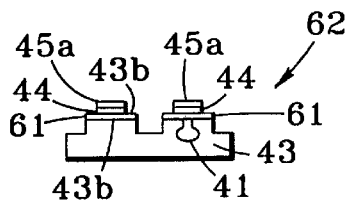

Thereafter, as shown in FIG. 22(h), after the patterned first and second dry film resists 46 and 48 are removed, the rod 43 is divided into a plurality of head sliders 62 of magnetic heads by cutting the concave portions 49 with a dicing saw every other row.

As is described above, because the DLC film 45 is patterned according to the photo-lithography, and the patterned DLC films 45a are used as the projections 45a. Therefore, the size and positions of the projections 45a can be precisely determined.

Also, because the first dry film resist 46 of which a film thickness is constant over the entire rod 43 is used as a mask to form the projections 45a, the projections 45a can be produced at the same size with a high accuracy, and the mass productivity of the projection 45a can be improved.

Also, in this embodiment, after the projections 45a are formed on the rail planes 43b, the concave portions 49 are formed at regions far from the projections 45a. Therefore, the second dry film resist 48 can be laminated on the patterned first dry film resists 46 without removing the patterned first dry film resists 46. That is, only one removing process is required to remove the two types of film resists 46 and 48. Accordingly, the manufacturing process of the head slider 62 can be simplified.

As for features of the fifteenth embodiment differing from those in the fourteenth embodiment, because the protective film 61 for covering the portions of the magnetic transducers 41 are formed before the formation of the adhesive layer 44, a process of the formation of the protective film 61 can be continuously performed with one sputtering film forming apparatus. Therefore, the protective film 61 can be easily formed as compared with the formation of the protective film 50 in the fourteenth embodiment.

In cases where a silicon carbide (SiC) film or a silicon (Si) film is formed between the protective film 61 and the rod 43, the stiction between the protective film 61 and the rod 43 can be enhanced.

In the fourteenth and fifteenth embodiments, the second dry film resist 48 are laminated on the patterned first dry film resists 46, which are formed in the circular or elliptic shape and are used as a mask for the formation of the projections 45a and 45b, without removing the patterned first dry film resists 46. Therefore, in cases where the resist 46 is thick and has a diameter of 60 $\mu$m or more, bubbles are undesirably generated around each of the patterned first dry film resists 46 in annular shape after the formation of the second dry film resist 48. When the bubbles spread over regions in which the concave portions 49 are formed, the formation of the concave portions 49 according to a ion etching technique is disturbed by the bubbles, and the concave portions 49 having undesired shapes are formed. In other words, the patterned rail planes 43a having undesired shapes are formed. Therefore, a yield rate of the head slider 51 or 62 is lowered. However, in cases where the thickness of the first dry film resist 46 is 10 $\mu$m or less, the bubbles are hardly generated. Therefore, in cases where the thickness of the first dry film resist 46 is 10 $\mu$m or more, the patterned first dry film resists 46 are successively etched by the oxygen plasma subsequently to the formation of the projections 45a in the etching process shown in FIG. 18(f) or 22(c). As a result, the patterned first dry film resists 46 are thinned, and the thickness of the resists 46 can be reduced to 10 $\mu$m or more.

Also, the second dry film resist 48 are used to form the concave portions 49 on the head slider 51 or 62. However, because an allowable error of a size in the concave portions 49 is larger than that in the projections 45a and 45b, it is applicable that the rod 43 be coated with liquid resist in place of the second dry film resist 48 and the liquid resist be baked, exposed to light and developed.

Also, the material of the projections 45a and 45b are not limited to the diamond-like carbon, and a material having a resistance against the wear of the magnetic disk 52 and the projections 45a and 45b can be used for the projections 45a and 45b.

Also, the concave portions 49 are formed after the formation of the projections 45a and 45b. However, it is applicable that the concave portions 49 be formed before the formation of the projections 45a and 45b. In this case, it is required to remove the resist used for the formation of the concave portions 49 before the formation of the projections 45a and 45.

Also, the head slider 51 or 62 having the magnetic transducer 41 is used for the magnetic recording drive.

The 16th Embodiment

Next, preferred embodiments according to the third concept of the present invention are described with reference to drawings to solve the third object.

Figure 23:
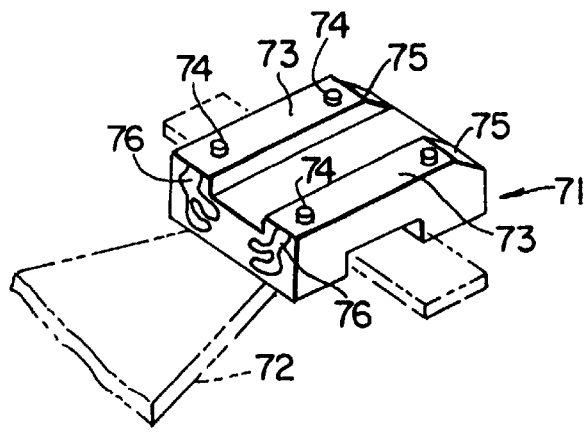
FIG. 23 is an oblique view of a head slider of a magnetic head according to the sixteenth embodiment of the present invention.

FIG. 23 is an oblique view of a head slider of a magnetic head according to the sixteenth embodiment of the present invention.

As shown in FIG. 23, a head slider 71 is made of a ceramic with an alumina base and is supported by a load beam 72. When the rotation of a magnetic disk is stopped, the slider 71 being supported by the plate spring 72 is set on a surface of the magnetic disk. Also, a pair of rail planes 73 respectively formed in a stripe shape are arranged in relief at both ends of a surface of the slider 71 facing a magnetic disk (or a magnetic recording medium). Near air inflow and outflow end of each rail plane 73, two pairs of projections 74 formed according a photo-lithography with a mask and an ion milling are arranged to prevent the contact of all rail planes 73 with the magnetic disk. The rail plane 73 functions as an air bearing plane. Also, an inclined plane 75 is formed on an air inflow end side portion of each rail plane 73 to give a floating force based on an airflow to the slider 71. Also, a pair of magnetic transducers 76 such as a magneto-resistive effect device or a spin valve magneto-resistive effect device are arranged at air outflow ends portions of the rail planes 73.

Figure 24:
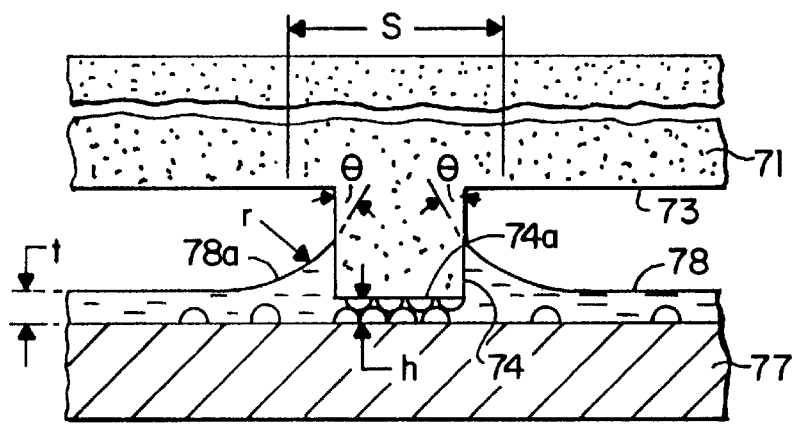
FIG. 24 is an enlarged view showing a contact condition at a contact point of the slider and a magnetic disk when the magnetic disk is not rotated.

FIG. 24 is an enlarged view showing a contact condition at a contact point of the slider 71 and a magnetic disk 77 when the magnetic disk 77 is not rotated.

As shown in FIG. 24, minute irregularities exist on a surface of the magnetic disk 77 and a surface of each projection 74 of the slider 71. An average roughness is defined as an average of irregularity distances between centers of the minute irregularities and a surface. An average roughness Ra on the surface of the magnetic disk 77 is 4 nm or less (for example, 2 nm), and the surface of the magnetic disk 77 is coated with a lubricant to form a lubricant layer 78 with a thickness t of 4 nm. A height of each projection 74 arranged on the rail plane 73 is two or more times as high as the average roughness Ra on the surface of the magnetic disk 77. For example, the height of each projection 74 is 10 nm. Also, an average roughness at a top portion 74a of the projection 74 is about 1 nm. Therefore, the thickness of the lubricant layer 78 is smaller than the height of the projection 74 and is larger than the average roughness Ra on the surface of the magnetic disk 77. Also, the lubricant layer 78 extends to the side walls of the projections 74 by the function of a surface tension of the lubricant.

A total area of the top portions 74a of the four projections 74 is 10% or less of a total area of the rail planes 73. For example, the total area of the top portions 74a of the four projections 74 is 0.05 mm² in a case of 30% slider. Also, a crown height of the rail surface 73 of the slider 71 is set to be small. As a result, flat degrees of the top portions 74a of the four projections 74 are set to be a value equal to or lower than a value determined by subtracting the average roughness Ra on the surface of the magnetic disk 77 from the thickness of the lubricant layer 78.

Also, a clearance between the top portion 74a of the projection 74 and the surface of the magnetic disk 77 is about a value h=3 nm. Therefore, because the thickness t of the lubricant layer 78 is 4 nm, the clearance is smaller than the thickness t of the lubricant layer 78. Also, even though the clearance changes with the flat degree of the of the top portion 74a and an ambient temperature, the change of the clearance is sufficiently small. Therefore, the clearance between the top portion 74a of the projection 74 and the surface of the magnetic disk 77 is perfectly occupied by the lubricant layer 78, and not only side surfaces of the projections 74 but also roots of the projections 74 are covered with the lubricant layer 78 to form meniscus portions 78a of the lubricant layer 78 around the four projections 74. Each of the meniscus portions 78a of the lubricant layer 78 is formed in an annular shape and has a larger diameter than that of the projection 74, and a side surface of the meniscus portion 78a is formed in a concave shape. Because the projection 74 having the height of 10 nm is sufficiently high, any other meniscus portion is not formed on a portion of the rail planes 73 on which any projection is not arranged.

The stiction between the slider 71 of the magnetic head and the magnetic disk 77 results from the formation of the meniscus portion 78a, and a strength F of the stiction is determined according to an equation (1).

$$F = S \times (T/r) \qquad (1)$$

Here, the symbol S denotes an area of a region of the slider 71 covered with the lubricant layer 78, the symbol T denotes a surface tension of the lubricant layer 78, and the symbol r denotes a meniscus radius of a circle, as shown in FIG. 24, formed along the side surface of the meniscus portion 78a. A center of the circle is placed between the slider 71 and the lubricant layer 78. The smaller the strength F of the stiction, the more easily the slider 71 can lift up when the rotation of the magnetic disk 77 is started.

Figure 25:
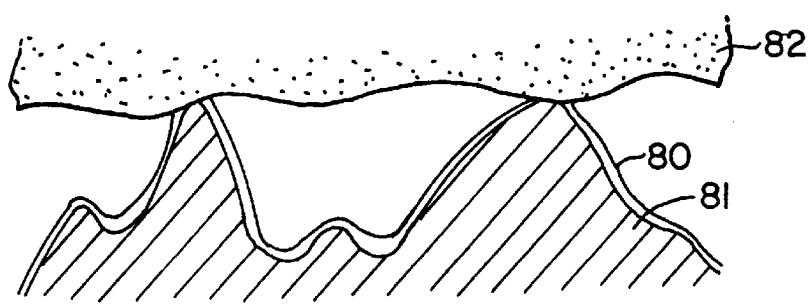
FIG. 25 is an enlarged view showing a contact condition at a contact point of a slider and a magnetic disk through a lubricant layer according to a prior art.

FIG. 25 is an enlarged view showing a contact condition at a contact point of a slider 82 and a magnetic disk 81 through a lubricant layer 80, according to a prior art.

In a prior art shown in FIG. 25, a surface roughness of the magnetic disk 81 is formed larger than a thickness of the lubricant layer 80, so that an area of the slider 82 covered with the lubricant layer (equivalent to the area S in the equation (1)) is reduced. However, because it has been recently required that the surface roughness of the magnetic disk 81 is set to be small, it is required to thin the lubricant layer 80 for the purpose of reducing the area S. In this case, there is a drawback that the magnetic disk 11 is not reliably covered with the lubricant layer 80.

Also, in another prior art disclosed in the PUJPA No. S63-37874, an area S of portions covered with a liquid is made small, and the strength F of the stiction is reduced. However, an idea that the strength F of the stiction is made small by increasing the meniscus radius r of a meniscus portion of a lubricant layer generated around a projection is not disclosed.

Here, as shown in FIG. 24, let θ denote a contact angle between the lubricant layer 78 and the slider 71, and let d denote an open distance between the rail plane 73 not covered with the lubricant layer 78 and an upper surface of the lubricant layer 78. In this case, the meniscus radius r of the meniscus portion 78a is geometrically expressed by an equation (2).

$$r = 0.5 \times d/(1 + \cos \theta) \qquad (2)$$

Therefore, the larger the open distance d between the rail plane 73 and the lubricant layer 78 placing under the meniscus portions 78a, the smaller the strength F of the stiction becomes. However, it is required to increase the film thickness t of the lubricant layer 78 for the purpose of covering the projections 74 of the slider 71, so that the area S in the equation (1) is apt to be increased. To avoid the increase of the area S, it is required that the height of the projections 74 is determined on condition that the meniscus portions 78a are limitedly formed around the projections 74 and any meniscus portion is not formed in any other position. That is, by adjusting the height of the projections 74, the meniscus radius r and the area S in the equation (1) can be appropriately controlled.

In a prior art, rail planes of a slider is positively formed in a crown shape. In contrast, in the present invention, it is preferred that a degree of crown set for the rail planes 73 of the slider 71 be small to reliably form the meniscus portions 78a shown in FIG. 24. For example, In the PUJPA No. S63-37874, an prior art in which a degree of crown ranging from $1.27 \times 10^{-2}$ μm to $7.62 \times 10^{-2}$ μm and a three-dimensional surface roughness ranging from $5.08 \times 10^{-3}$ μm to $1.52 \times 10^{-3}$ are set for a slider surface is disclosed. In contrast, in this embodiment, it is preferred that a degree of crown be smaller than $1.27 \times 10^{-2}$ μm. Also, the surface roughness of the rail planes 74 is made small, and the height of the projections 74 is set to enlarge the meniscus radius r of the meniscus portions 78a. Therefore, the strength F of the stiction is reduced in this embodiment.

To apparently describe the effects of this embodiment, a case in which this embodiment is applied and another case in which this embodiment is not applied are described.

Figure 26:
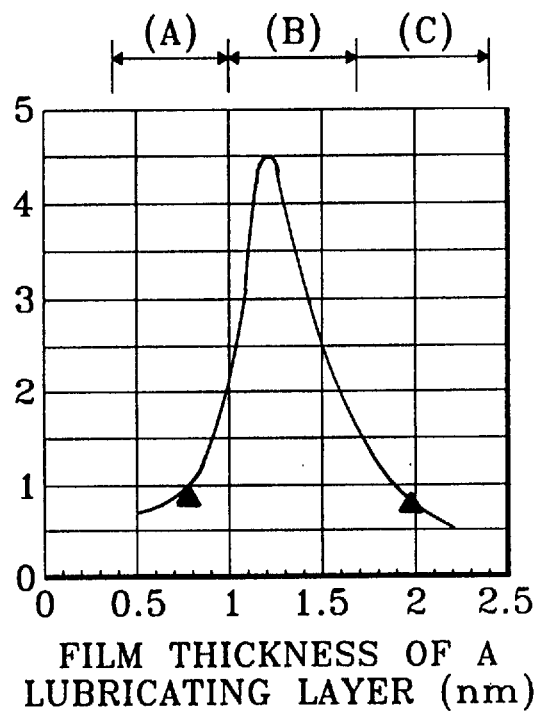
FIG. 26 shows a relationship between a static friction between projections and the magnetic disk and the film thickness of a lubricant layer according to the sixteenth embodiment.
Figure 27:
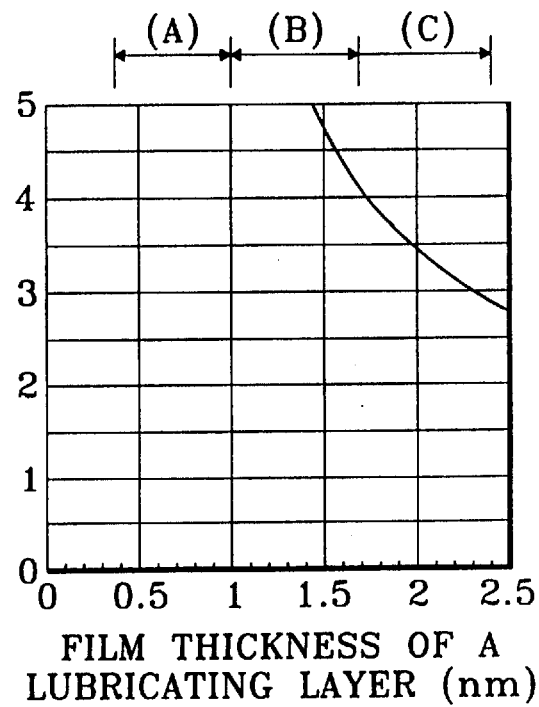
FIG. 27 shows a relationship between a static friction, created by a slider and a magnetic disk, and a film thickness of a lubricant layer on condition that the slider does not have projections extending toward the disk.

FIG. 26 shows a relationship between a static friction between the projections 74 of the slider 71 and the magnetic disk 77 and the film thickness t of the lubricant layer 78, on condition that the projections 74 are arranged on the rail planes 73 according to the sixteenth embodiment. FIG. 27 shows a relationship between a static friction between a slider and a magnetic disk and a film thickness of a lubricant layer on condition that the slider does not have projection is not arranged.

A contact area between the slider 71 of the magnetic head and the magnetic disk 77 in cases where the projections 74 are arranged is reduced to 1/100 as compared with that in cases where any projection is not arranged. Also, the average roughness of the surface of the magnetic disk 77 is about 1 nm.

By comparing FIGS. 25(a) and 25(b) with each other, in cases where the thickness t of the lubricant layer 78 is smaller than the average roughness (1 nm) of the surface of the magnetic disk 77 (A region in FIGS. 25(a) and 25(b)), the static friction according to the sixteen embodiment is, as shown in FIG. 26, reduced because of the presence of the projections 74. The reason is that the number of meniscus portions 78a is decreased because the contact area is reduced. This effect can be obtained by arranging a plurality of projections on rail planes of a conventional slider.

In contrast, in cases where the thickness t of the lubricant layer 78 is sufficiently larger than the average roughness (1 nm) of the surface of the magnetic disk 77 (C region in FIGS. 25(a) and 25(b)), the static friction according to the sixteen embodiment is slightly reduced as compared with that in the A region shown in FIG. 26. The surface of the magnetic disk 77 is not perfectly covered with the lubricant layer 78 when the lubricant layer is not sufficiently thick (A region in FIG. 26), and there is a probability that the magnetic disk 77 is abraded by the projections 74 even though the static friction is small. However, because the static friction is also small in case of the C region shown in FIG. 26 in the same manner as that in case of the A region, it is preferred to sufficiently thicken the lubricant layer 78 for the purpose of improving the reliability of a magnetic disk apparatus composed of the slider 71 and the magnetic disk 77 covered with the lubricant layer 78. This effect cannot be obtained by merely arranging a plurality of projections on rail planes of a conventional slider.

When the lubricant layer 78 is moreover thickened according to the sixteenth embodiment on condition that the thickness t of the lubricant layer 78 is more than a certain film thickness, the static friction is again increased (not shown in FIG. 26). The reason is that one or more meniscus portions are additionally formed on portions of the magnetic disk 77 on which any projection is not arranged. However, in practice, it is not appropriate for the magnetic disk 77 to be excessively coated with the lubricant for the purpose of preventing the scattering of the lubricant when the magnetic disk 77 is rotated. Therefore, a region corresponding to the case that the lubricant layer 78 having an excessive thickness is arranged is omitted in FIGS. 25(a) and 25(b).

By comparing B regions shown in FIGS. 25(a) and 25(b) with each other, the static friction between the projections 74 of the head slider 71 and the magnetic disk 77 in the B region shown in FIG. 26 is almost the same as that between a head slider and the magnetic disk 77 in the B region shown in FIG. 27. In the B region, the top surfaces of the projections 74 are covered with the lubricant, the meniscus radius r of the meniscus portions 78a is as small as the clearance h, and the contact area S is only increased. Therefore, the static friction is large in the B region.

The 17th Embodiment

Next, the seventeenth embodiment is described.

Figure 28:
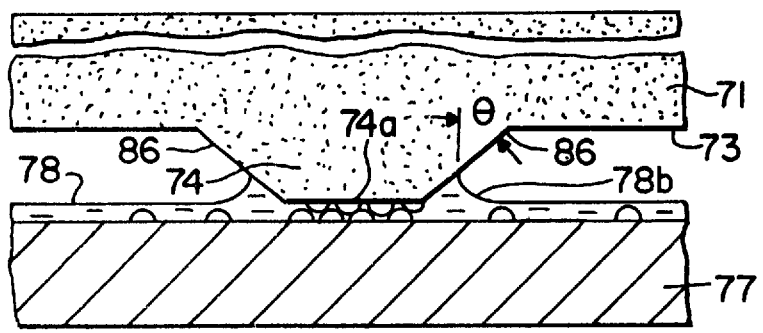
FIG. 28 is an enlarged view of a contact point of a slider and a magnetic disk according to the seventeenth embodiment of the present invention.

FIG. 28 is an enlarged view of a contact point of the slider 71 and the magnetic disk 77 according to a nineteenth embodiment of the present invention.

As shown in FIG. 28, a taper portion 86 is integrally formed with each of the projections 74 to be arranged on the side surface of each of the projections 74. An area of a cross section of the taper portion 86 facing the magnetic disk 77 is gradually increased along a direction from the top portion 74a of the projection 74 to the plane 73.

Because the taper portion 86 is inclined against the magnetic disk 77 to make an acute angle between the taper portion 86 and the magnetic disk 77, the lubricant forced out from a clearance between the projection 74 and the magnetic disk 77 is easily moved up along a surface of the taper portion 86 by the function of a capillary cohesion of the lubricant for the taper portion 86, and a meniscus portion 78b having a large meniscus radius r can be easily formed around each of the projections 74. Therefore, even though the film thickness t of the lubricant layer 78 is made small, the meniscus portion 78b having a large meniscus radius r can be reliably formed around each of the projections 74.

Accordingly, in cases where the lubricant layer 78 cannot be thickened for the purpose of improving rotation starting characteristics of the magnetic disk 77, the presence of the taper portion 86 is useful because the lubricant layer 78 can be thinned.

The 18th Embodiment

Next, the eighteenth embodiment is described.

Figure 29:
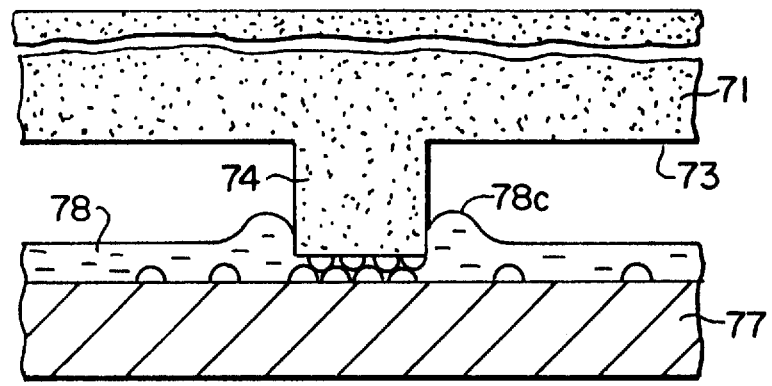
FIG. 29 is an enlarged view of a contact point of a slider and a magnetic disk according to the eighteenth embodiment of the present invention.

FIG. 29 is an enlarged view of a contact point of the slider 71 and the magnetic disk 77 according to a twentieth embodiment of the present invention.

As shown in FIG. 29, each of the projections 74 of the slider 71 is made of a material repelling the lubricant made of an oiliness agent or an aqueous agent. Therefore, a meniscus portion 78c having an inversely curved surface which is curved inversely to the meniscus portions 78a and 78b according to the sixteenth to nineteenth embodiments is generated around each of the projections 74. In this case, the meniscus portion 78c is equivalent to the meniscus portion 78a or 78b having a large meniscus radius r, and the strength F of the stiction between the slider 71 and the magnetic disk 77 is made small.

Also, because the lubricant layer 78 is swollen around each of the projections 74, a force slightly lifting each of the projections 74 is generated. Therefore, the strength F of the stiction is reduced.

Also, in cases where all of the rail planes 73 are made of a material repelling the lubricant, the formation of the meniscus portion 78a or 78c on the rail surfaces 73 can be prevented. Therefore, the strength of the stiction can be moreover reduced.

The 19th Embodiment

Next, the nineteenth embodiment is described.

FIGS. 30(a) to 30(g) are oblique views showing a manufacturing method of a slider of a flying type magnetic head according to the twenty-first embodiment of the present invention.

Figure 30A:
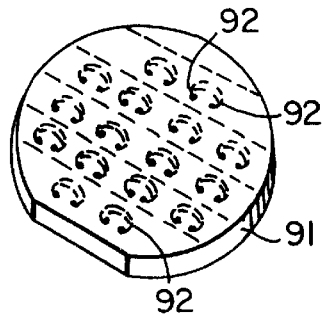
FIGS. 30(a) to 30(g) are oblique views showing a manufacturing method of a slider of a flying type magnetic head according to the nineteenth embodiment of the present invention.
Figure 30D:
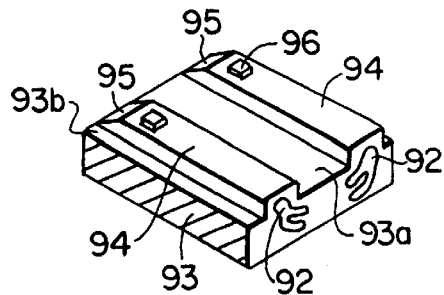
Figure 30B:
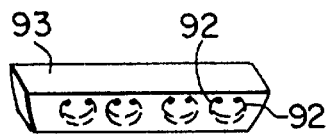

As shown in FIG. 30(a), a plurality of magnetic transducers 92 are formed longitudinally and laterally on a wafer 91 made of a material such as alumina titanium carbide (Al₂O₃TiC), ferrite, calcium titanate or the like. Thereafter, the wafer 91 is cut with a dicing saw along dotted lines shown in FIG. 30(a) to divide the wafer 91 into a plurality of rods 93. Therefore, as shown in FIG. 30(b), the plurality of rods 93 respectively having a plurality of magnetic transducers 92 arranged in series are obtained from the wafer 91.

Figure 30E:
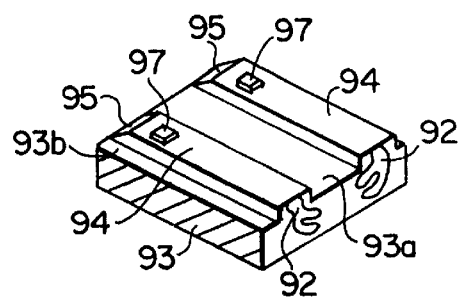
Figure 30C:
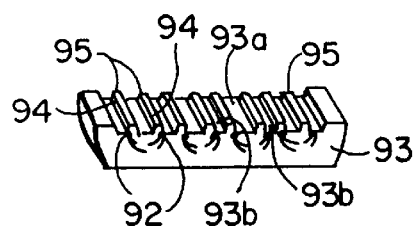

Thereafter, as shown in FIG. 30(c), a cutting plane of the rod 93 is processed according to a photo-lithography. That is, a plurality of rail planes 94 are formed in relief on the magnetic transducers 92 in one-to-one correspondence, a concave portion 93a is formed between a pair of rail planes 94 arranged in a slider of a magnetic head, a separating groove 93b is formed in a boundary portion of a pair of slider units adjacent to each other for each pair of slider units, and an inclined plane 95 is formed on an air inflow end side portion of each of the rail planes 94. The rail planes 94 respectively function as an air bearing plane and a flying force generating plane.

Thereafter, all of the cutting plane of the rod 93 is coated with a photoresist, and the photoresist is exposed to light and is developed. Thereafter, as shown in FIG. 30(d), at least one patterned resist 96 formed in a rectangular or circular shape is formed on each of the resist planes 24. Thereafter, the rail planes 94 are thinned according to an ion milling technique while using the patterned resists 96 as a mask, and a projection 97 is formed under the patterned resist 96 of each of the rail planes 94. Thereafter, the patterned resists 96 are removed with a solvent. Therefore, as shown in FIG. 30(e), the projections 97 are arranged on the rail planes 94.

Figure 30F:
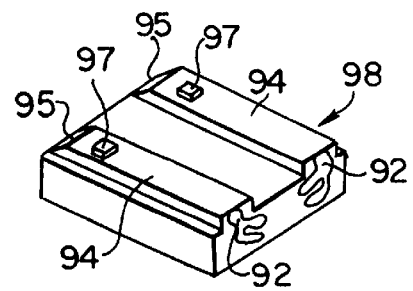

Thereafter, the rod 93 is divided into a plurality of slider units by cutting the separating grooves 93b of the rod 93 with a dicing saw. Therefore, a plurality of sliders 98 are formed from the rod 93, and one slider 98 is shown in FIG. 30(f).

Figure 30G:
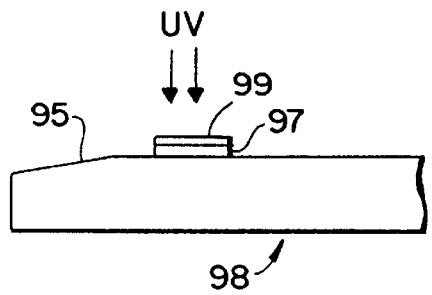

Thereafter, as shown in FIG. 30(g), a top portion of the projection 97 arranged on the rail plane 94 is coated with a lubricant 99. In this case, a fluorine-contained material is preferred as a material of the lubricant 99. Also, to coat the top portion of the projection 97 with the lubricant 99, a method that the rail planes 94 and the separating grooves 93b of the rod 93 are immersed in a dilute lubricant before the rod 93 is cut or another method that the slider 98 of the magnetic head is immersed in the dilute lubricant after a gimbal assay.

Figure 31:
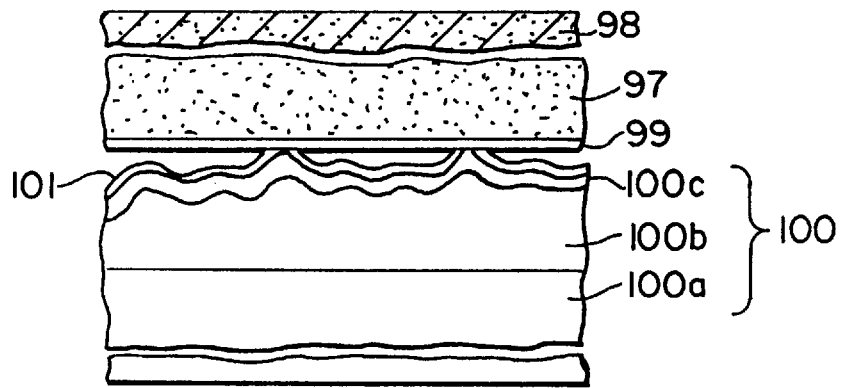
FIG. 31 is an enlarged view of a contact point of a slider and a magnetic disk according to the nineteenth embodiment.

The lubricant 99 with which the top portions of the projections 97 are coated functions to lower a surface energy of the projections 97. Therefore, as shown in FIG. 31, in cases where the projections 97 of the slider 98 is put on a magnetic disk 100, a so-called solid contact between the slider 98 and the magnetic disk 100 can be avoided. In detail, in cases where the magnetic disk 100 is composed of a substrate 100a, a magnetic layer 100b and a protective film 100c laminated in that order and the protective film 100c of the magnetic disk 100 is coated with a lubricant layer 101, the lubricant 99 makes contact with parts of the protective film 100c of the magnetic disk 100 while breaking through the lubricant layer 101. In this case, because the lubricant 99 is arranged on the projections 97 of the slider 98, the solid contact that the projections 97 directly makes contact with the protective layer 100c of the magnetic disk 100 can be avoided. Also, a strength of the stiction between the projections 97 and the protective layer 100c is lowered. As a result, the abrasion of the projections 97, the abrasion of the magnetic disk 100 and the stiction between the projections 97 and the magnetic disk 100 can be suppressed.

Also, it is preferred that a fluorine-contained lubricant having a water repellent property be used as a material of the lubricant 79 covering the top portions of the projections 97. In this case, the cohesion of moisture existing around the projections 97 can be avoided, and a strength of the stiction between the projections 97 and the magnetic disk 100 is decreased.

Figure 32:
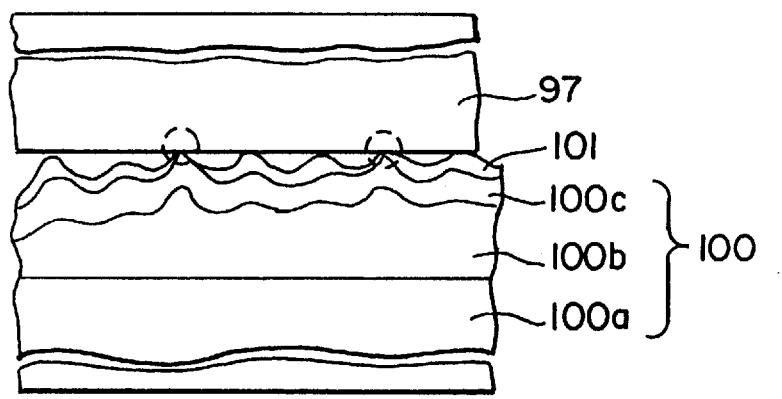
FIG. 32 is an enlarged view of a contact point of a slider and the magnetic disk on condition that top portions of projections are not coated with any lubricant.

In contrast, assuming that the top portions of the projections 97 are not coated with the lubricant 99, the surface energy of the projections 97 is heightened. In this case, as shown in FIG. 32, the projections 97 break through the lubricant layer 101 covering the magnetic disk 100, and the solid contact that the projections 97 directly makes contact with the protective layer 100c of the magnetic disk 100 easily occurs. Therefore, the abrasion of the projections 97 and the abrasion of the magnetic disk 100 are accelerated. A position of the solid contact is shown in FIG. 32 by a dotted circle line.

The 20th Embodiment

Next, the twentieth embodiment is described. In the twenty-first embodiment, the projections 97 arranged on the rail planes 94 of the slider 98 are made of the same material as that of the slider 98. However, it is applicable that the material of the projections 97 differ from that of the slider 98. A manufacturing method of a slider of a flying type magnetic head in which the material of the projections differs from that of the slider is described with reference to FIGS. 33(a) to 33(d) according to the twenty-second embodiment of the present invention.

Figure 33A:
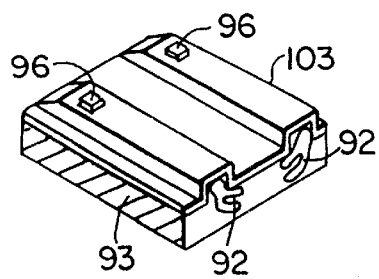
FIGS. 33(a) to 33(d) show a manufacturing method of a slider of a flying type magnetic head according to the twentieth embodiment of the present invention.

After the separating grooves 93b and the rail planes 94 are formed in the rod 93 cut out from the wafer 91 in the same manner as in the twenty-first embodiment, as shown in FIG. 33(a), the rail planes 94, the inclined plane 95, the concave portions 93a and the separating grooves 93b are covered by a protective film 103 made of an amorphous carbon. The protective film 103 grows according to a sputtering method. Thereafter, the patterned resists 96 are formed on the rail planes 94 through the protective film 103 in the same manner as in the twenty-first embodiment.

Figure 33B:
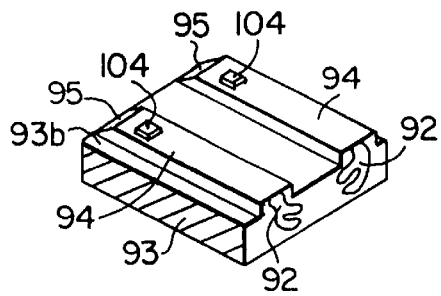

Thereafter, portions of the protective film 103 not covered by the patterned resists 96 are removed to use patterned protective films 103 placed under the patterned resists 96 as projections 104. In cases where the protective film 103 formed of an amorphous carbon film is patterned, it is applicable that a plasma usher method be used in place of the ion milling method. Thereafter, the patterned resists 96 are removed. Therefore, as shown in FIG. 33(b), the projections 104 are arranged on the rail planes 94.

Figure 33C:
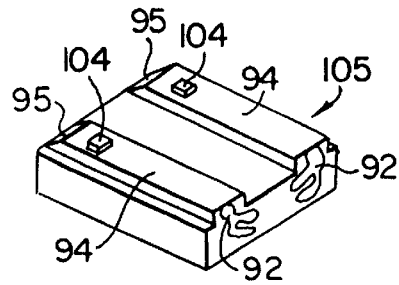
Figure 33D:
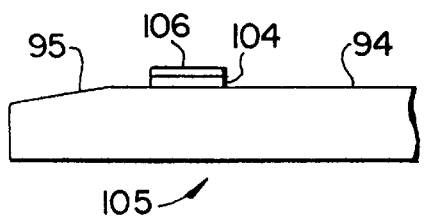

Thereafter, the rod 93 is divided into a plurality of sliders by cutting the separating grooves 93b of the rod 93 with a dicing saw in the same manner as in the twenty-first embodiment. Therefore, as shown in FIG. 33(c), a slider 105 of a magnetic head is obtained. Thereafter, as shown in FIG. 33(d), top portions of the projections 104 made of the amorphous carbon are coated with a lubricant 106. In this case, a fluorine-contained lubricant having a benzene ring, for example, such as a Fomblin AM™ manufactured in the Montefluous Co. is preferred as a material of the lubricant 106 because the fluorine-contained lubricant has a superior sticking tendency for the amorphous carbon.

Thereafter, the lubricant 106 is irradiated with ultra-violet light to increase the sticking tendency between the lubricant 106 and the projections 104 made of the amorphous carbon. For example, the fluorine-contained lubricant is formed on the projections 104 with a thickness of 5 nm, the ultra-violet light having a wavelength of 185 nm and an intensity of 1 mW/cm$^2$ is radiated to the fluorine-contained lubricant, and a sticking layer having a thickness of 3 nm is formed on the top portions of the projections 104.

Figure 34:
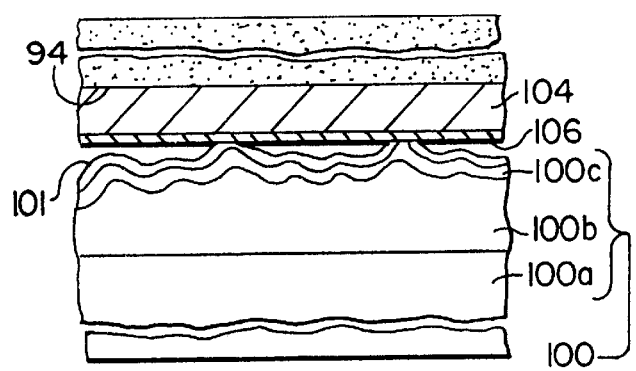
FIG. 34 is an enlarged view of a contact point of a slider and the magnetic disk according to the twentieth embodiment.

The lubricant 106 with which the top portions of the projections 104 are coated functions to decrease a surface energy of the projections 104. Therefore, as shown in FIG. 34, when the projections 104 of the slider 105 are put on the magnetic disk 100, there is no case that the lubricant layer 101 laminated on the protective film 100c is broken though by the projections 104, and a solid contact that the projections 104 directly make contact with portions of the protective film 100c does not occur. Also, a strength of the stiction between the projections 104 and the protective film 101 of the magnetic disk 100 is lowered. As a result, the abrasion of the projections 104, the abrasion of the magnetic disk 100 and the stiction between the projections 104 and the magnetic disk 100 can be suppressed.

In this embodiment, the projections 104 is made of the amorphous carbon. However, it is applicable that an oxide thine film such as a silicon oxide ($SiO_2$) or a zirconia ($ZrO_2$) be used as a material of the protective film 103 and be patterned to form the projections 104. In this case, a fluorine-contained lubricant having a hydroxyl group, for example, such as a Fomblin Z-DOL manufactured in the Montefluous Co. is preferred as a material of the lubricant 106 with which the top portions of the projections 104 made of the oxide thin film are coated because the fluorine-contained lubricant has a superior sticking tendency for the oxide thin film.

Also, even though the projection 104 made of the amorphous carbon is not coated with any lubricant, the surface energy of the projection 104 can be decreased by fluorinating the surface of the projection 104. As carbon used as a material of the projections 104, a carbon hydride in which diphenyl-ethane exists as a monomer is, for example, used. The carbon hydride is deposited to form the protective film 103 on the rail planes 94 or the like according to a sputtering method or a plasma CVD method. Thereafter, the protective film 103 is patterned to form the projections 104, and the surfaces of the projections 104 are fluorinated, for example, by using a plasma etching apparatus. The condition for fluorinating the projections 104 is as follows. A plasma generating power is set to 300 W, a pressure of fluorine-contained atmosphere is reduced to 5 Torr, a mixing gas in which oxygen ($O_2$) is added to carbon tetrafluoride ($CF_4$) in a flow rate of 5% is input to the fluorine-contained atmosphere, and the fluoridization of the projections 104 is continued for 10 minutes. In this case, it is applicable that argon gas be used in place of the oxygen. Thereafter, a contact angle between water and the fluoridized projection 104 is measured to check the fluoridization of the projections 104. Though the contact angle is only 52 degrees before the fluoridization of the projections 104, the contact angle is increased to 162 degrees after the fluoridization of the projections 10. Therefore, it is ascertained that the surface energy of the projections 104 made of carbon is lowered and a water repellent property of the projections 104 is heightened.

It is applicable that a thickness of the lubricant layer 101 covering the magnetic disk 100 in the twenty-first or twenty-second embodiment be set to the same value as that of the lubricant layer 78 in the sixteenth embodiment.

The 21th Embodiment

Next, the twenty-first embodiment is described.

Figure 35A:
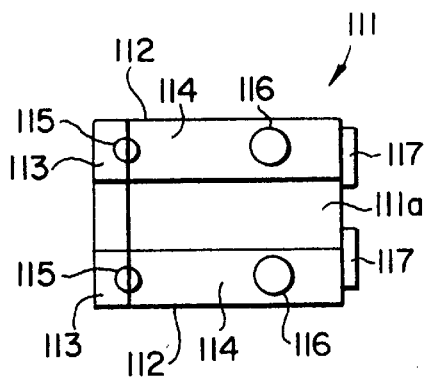
FIG. 35(a) is a plan view of a slider used for a magnetic disk apparatus according to the twenty-first embodiment.
Figure 35B:
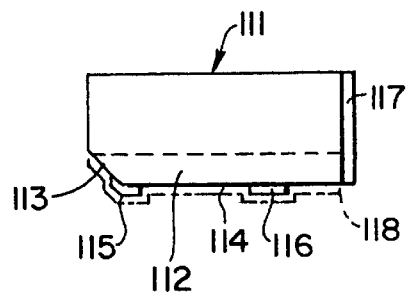
FIG. 35(b) is a side view of the slider shown in FIG. 35(a)

FIG. 35(a) is a plan view of a slider 51 used for a magnetic disk apparatus according to the twenty-third embodiment, and FIG. 35(b) is a side view of the slider shown in FIG. 35(a).

As shown in FIGS. 35(a) and 35(b), a slider 111 of a magnetic head is made of $Al_2O_3TiC$. A pair of rail planes (or a pair of air bearing planes) 112 formed in a stripe shape are arranged in relief along both end side portions of a surface of the slider 111 facing a magnetic disk (or a magnetic recording medium). An inclined plane 113 is formed on an air inflow end side portion of the rail planes 112 to partition each of the rail planes 112 into the inclined plane and a flat plane 114. Also, the first curved projection 115 is arranged on a boundary area between the flat plane 114 of each of the rail planes 114 and the inclined plane 113 along the flat plane 114 and the inclined plane 113. Also, the second projection 116 is arranged on an air outflow end side portion of each of the rail planes 112. A plane area of a top portion of the second projection 116 is larger than that of the first projection 116, and a height of the second projection 116 is the same as that of the first projection 115.

A plane of the first projection 115 facing the magnetic disk is formed in a shape of a circle having a diameter of 100$\mu$, and a plane of the second projection 116 facing the magnetic disk is formed in a shape of a circle having a diameter of 200$\mu$. Therefore, an area of the plane of the first projection 115 is half or less of that of the plane of the second projection 116.

In addition, a pair of magnetic transducers 117 such as a magneto-resistance effect device or a spin valve magneto-resistance effect device are arranged in air outflow end portions of the rail planes 73. The slider 111 is supported by a plate spring in the same manner as in the fourteenth embodiment.

In the above configuration, when the magnetic disk (not shown) is not rotated, the slider 111 of the magnetic head is in contact with a surface of the magnetic disk. When the rotation of the magnetic disk is started, the slider 111 supported by the plate spring (not shown) is lifted up from the surface of the magnetic disk according to a principle of a dynamic pressure air bearing in fluid lubrication. The air inflow end side portion of the slider 111 is first raised up, and the air outflow end side portion of the slider 111 is lifted up with the air inflow end side portion of the slider 111. The easier the air inflow end side portion of the slider 111 is raised up, the shorter a lifting time of the slider 111.

Figure 36:
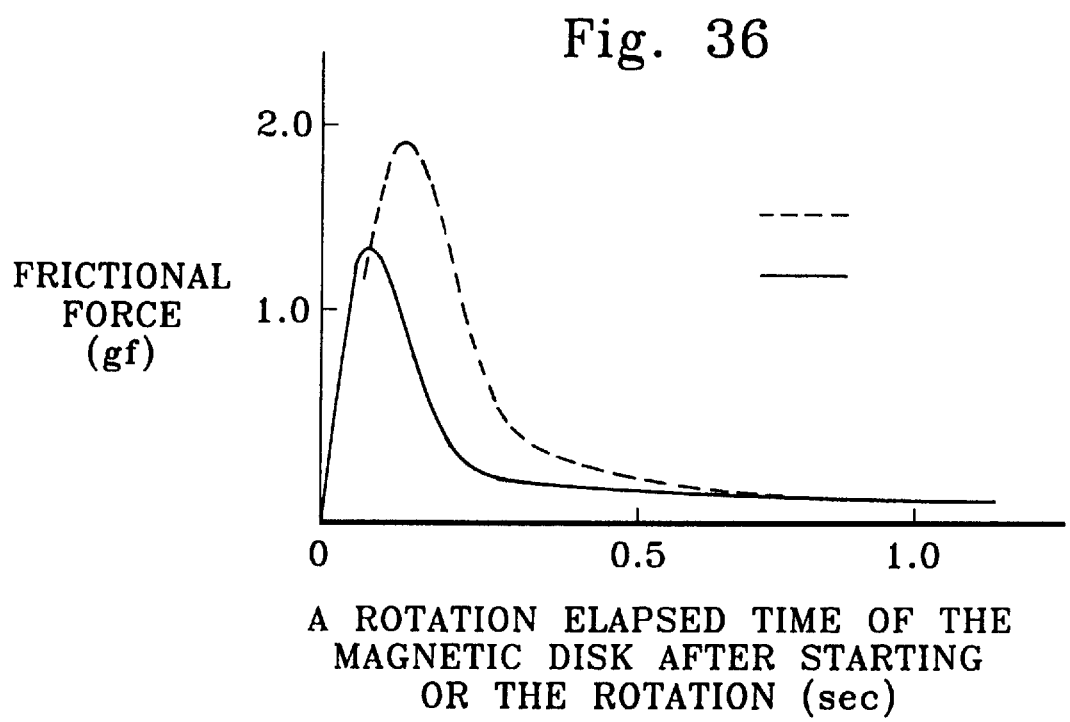
FIG. 36 is a relationship between a rotation elapsed time of the magnetic disk after the starting of the rotation in the magnetic disk and a frictional force (a friction force between the magnetic disk and the projections) on condition that a size of the first projection is used as a parameter.

A relationship between a rotation elapsed time of the magnetic disk after the starting of the rotation in the magnetic disk and a frictional force (a friction force between the magnetic disk and the projections) is examined by using a size of the first projection 115 arranged on the air inflow end side portion of the rail plane 112 as a parameter, and experimental results shown in FIG. 36 are obtained.

As shown in FIG. 36, a frictional force is maximized just after the starting of the rotation of the magnetic disk, the frictional force is gradually decreased as the rotation time passes. Also, the smaller an area of a top portion of the first projection 115 placed on the air inflow end side of the slider 111, the smaller the frictional force, and the shorter a maximizing time required to maximize the frictional force. These experimental results denote that a strength of the stiction between the slider 111 and the magnetic disk is decreased and a lifting time of the slider 111 is shortened as the area of the top portion of the first projection 115 becomes small.

Also, because the first projection 115 is gently bent along the boundary area from the flat plane 114 of the rail plane 112 to the inclined plane 113, a top corner of the first projection 115 facing the magnetic disk does not mechanically cause damage to the surface of the magnetic disk. Therefore, the damage of the first projections 115 and the magnetic disk can be prevented.

The second projections 116 placed on the air outflow end side of the rail planes 112 are detached from the magnetic disk after the first projections 115 are detached from the magnetic disk. Therefore, a loading force of the second projections 116 to the magnetic disk is larger than that of the first projections 115 to the magnetic disk. However, because an area of the top portions of the second projections 116 is larger than that of the first projections 115 to increase a mechanical strength of the second projections 116, the slider 111 has a superior durability, and it is difficult t do damage to the slider 111.

Also, as a two-dots-dash line is shown in FIG. 35(b), it is applicable that the rail planes 112 be covered by a protective film 118 made of a material such as $SiO_2$, $Al_2O_3$, Si, SiC or diamond-like carbon in the slider 111 shown in FIGS. 35(a) and 35(b). Also, it is applicable that materials of the projections 115 and 116 differ from a material of the slider 111.

The 22th Embodiment

A manufacturing method of a slider in which materials of the projections 115 and 116 differ from a material of the slider is described in brief with reference to FIGS. 37(a) to 37(e) and FIGS. 38(a) to 38(c) according to the twenty-second embodiment. FIGS. 37(a) to 37(e) respectively show a front view of the slider observed from the air outflow end, and FIGS. 38(a) to 38(c) respectively show a side view of the slider.

In the same manner as in the twenty-first embodiment, after a plurality of magnetic transducers are formed in a wafer made of $Al_2O_3TiC$, the wafer is cut off to form a plurality of rods, and cutting planes of the rods are processed according to a photo-lithography technique. Therefore, the inclined plane 113 shown in FIGS. 35(a) and 35(b) is formed on a substrate of each of the rods. The inclined plane 113 is easily formed by ion-milling a portion of the substrate from an oblique direction.

Figure 37A:
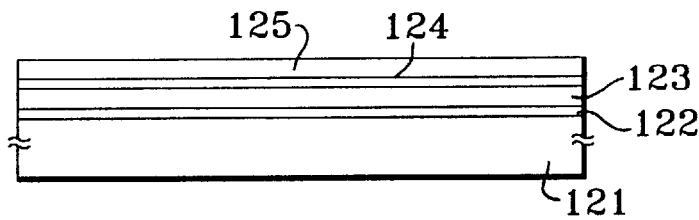
FIGS. 37(a) to 37(e) are front views showing a manufacturing method of a slider according to the twenty-second embodiment.
Figure 38A:
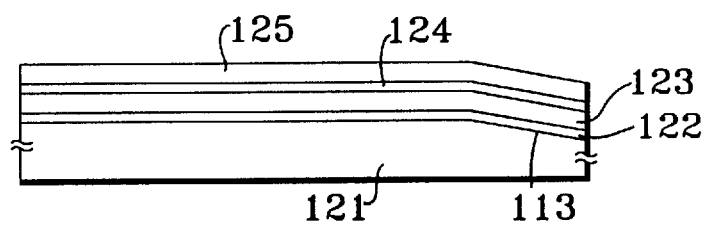
FIGS. 38(a) to 38(c) are side views showing the same manufacturing method.

Thereafter, as shown in FIGS. 37(a) and 38(a), an stiction layer 122 made of a silicon carbide (SiC) is formed on a substrate 121 with a thickness of 3 nm, a rail plane protecting film 123 made of a diamond-like carbon is formed on the stiction layer 122 with a thickness of 30 nm to protect rail planes, an intermediate film 124 made of Si or SiC is formed on the rail plane protecting film 123 with a thickness of 3 nm, and a contact film 125 made of a diamond-like carbon is formed on the intermediate film 124 with a thickness of 30 nm, in that order.

Figure 37B:
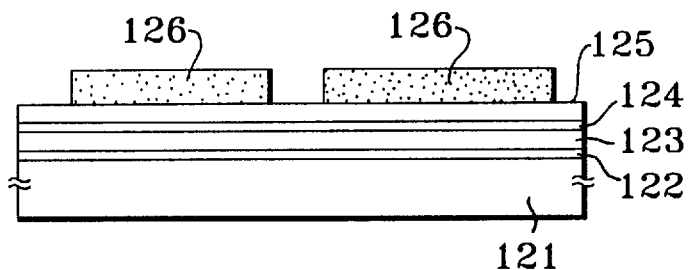

Thereafter, the contact film 125 is coated with a resist, and the resist is exposed to light such as ultra-violet light and is developed according to a photo-lithography. Therefore, as shown in FIG. 37(b), patterned resists 126 respectively formed in a stripe shape are arranged on the contact film 125. The patterned resists 126 cover regions on which the rail planes 112 are to be formed.

Figure 37C:
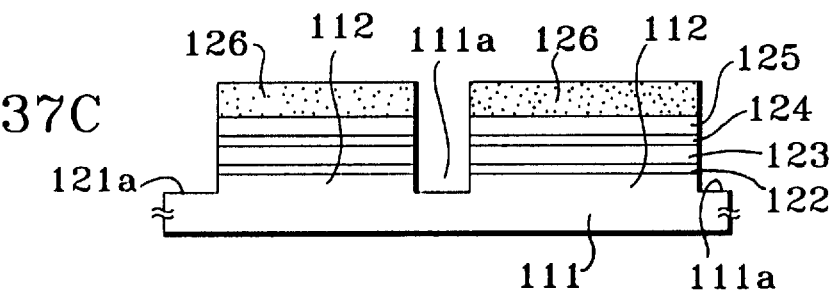

Thereafter, as shown in FIG. 37(c), a portion of the contact film 125, a portion of the intermediate film 124, a portion of the rail plane protecting film 123, a portion of the stiction layer 122 and an upper portion of the substrate 121 not covered by the patterned resists 126 are removed one after another by etching the films according to an ion milling technique. Therefore, the concave portions 114a respectively partitioning the substrate 121 into the pair of rail planes 112 are formed, and a plurality of separating grooves 121a partitioning a block composed of the rod and the films into a plurality of sliders are formed. Thereafter, the patterned resists 126 are removed.

Figure 37D:
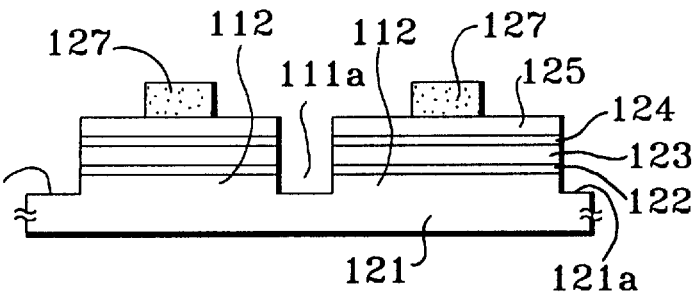
Figure 38B:
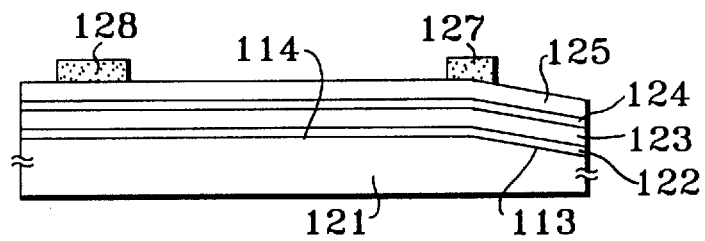

Thereafter, the contact film 125 patterned is coated with the second resist, and the second resist is exposed to light and is developed according to a photo-lithography. Therefore, as shown in FIGS. 37(d) and 38(b), a pair of first patterned resists 127 respectively formed in a cylindrical shape having a diameter of 100 $\mu$m are respectively formed on a boundary region between the flat plane 114 and the inclined plane 113 of the rail plane 112, and a pair of second patterned resists 128 respectively formed in a cylindrical shape having a diameter of 200 $\mu$m are formed on the air outflow end side of the rail planes 112.

Figure 37E:
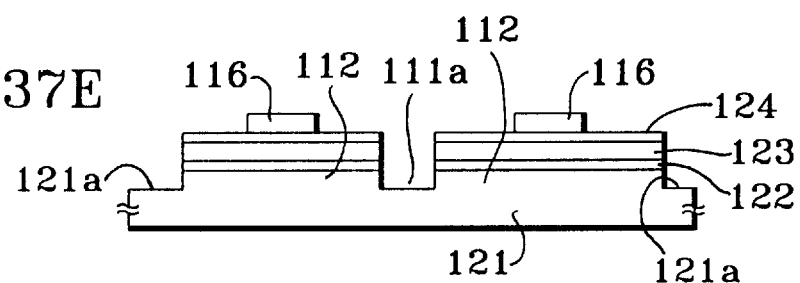
Figure 38C:
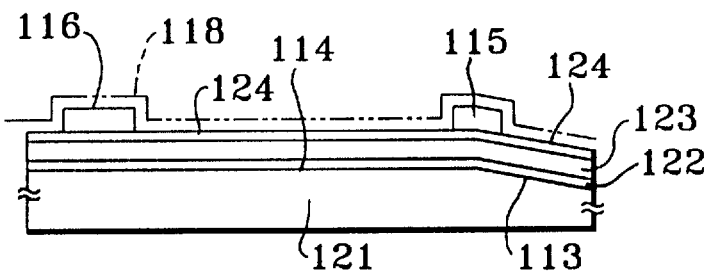

Thereafter, portions of the contact film 125 not covered by either the first patterned resists 127 or the second patterned resists 128 are removed by oxygen plasma, and the contact film 125 placed under the first and second patterned resists 127 and 128 is remained to form the first and second projections 115 and 116. Therefore, after the first and second patterned resists 127 and 128 are removed, as shown in FIGS. 37(e) and 38(c), the first and second projections 115 and 116 are arranged on the intermediate film 124. In this case, because the intermediate film 124 made of the silicon carbide (SiC) is not etched by the oxygen plasma, the film thickness of the rail plane protecting film 123 and the film thickness of the projections 115 and 116 become uniform, and sizes and shapes of the rail plane protecting film 123 and the projections 115 and 116 are set with a high accuracy, and a yield rate of a slider is improved.

Thereafter, the substrate 121 are divided into a plurality of sliders by cutting the separating grooves 121a. A longitudinal length of the slider along the rail plane 112 is 2 mm, a lateral length of the slider in a direction crossing the two rail planes 112 is 1.6 mm.

In the above manufacturing method, the projections 115 and 116 are formed from the contact film 125. However, it is applicable that the intermediate film 124 be used as additional portions of the projections 115 and 116 by patterning the intermediate film 124 with the projections 115 and 116 as a mask. Also, it is applicable that a material of the rail plane protecting film 123 covering the rail planes 112 be selected from a group of $SiO_2$, $Al_2O_3$, Si and SiC.

The shape and height of the projection and a sectional area of the top portion of the projection are required to be appropriately changed in dependence on the shape of the slider and a taper angle of the inclined plane 113. Also, as a two-dots-dash line is shown in FIG. 38(c), it is applicable that the projections 115 and 116 and the rail planes 112 be covered by the protective film 118 made of a material such as $SiO_2$, $Al_2O_3$, Si, SiC or diamond-like carbon. Also, The number of second projections 116 placed on the air outflow end side of the rail planes 112 is not limited to two. That is, it is applicable that a single second projection 116 be arranged in the slider. Also, it is applicable that the slider in this embodiment be used in place of the slider in the sixteenth embodiment.

The 23th Embodiment

Next, the twenty-third embodiment is described.

Figure 39:
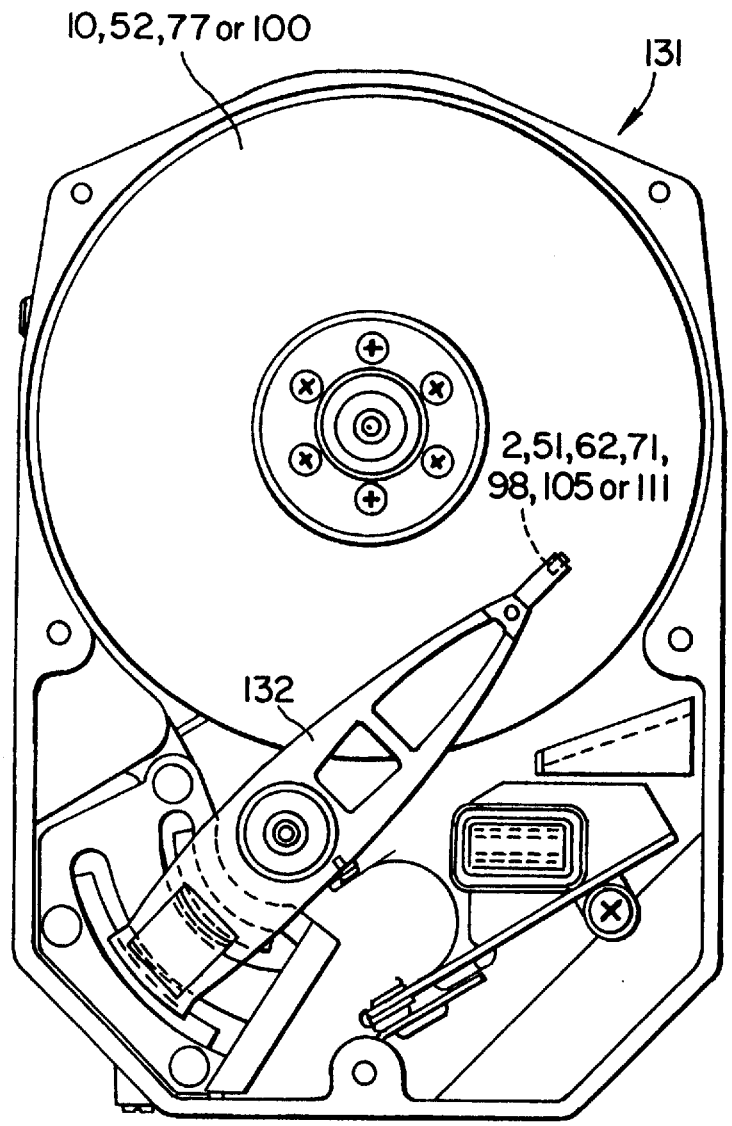
FIG. 39 is a plan view of a magnetic recording drive mainly composed of a slider and a magnetic disk according to the twenty-third embodiment of the present invention.

FIG. 39 is a plan view of a magnetic recording drive mainly composed of a slider and a magnetic disk according to the twenty-fifth embodiment of the present invention.

As shown in FIG. 39, a magnetic recording drive 131 comprises the magnetic disk 10, 52, 77 or 100, the slider 2, 51, 62, 71, 98, 105 or 111, and a spring arm 132 (or the supporting spring) for supporting the slider.

The surface of the magnetic disk 10, 52, 77 or 100 is partitioned into a data zone placed at the outermost side, a stop zone at which the movement of the slider is stopped, and a contact start stop (CSS) zone placed at the innermost side. When information is read or written from/in the magnetic disk, the slider flies on the data zone of the magnetic disk.

Therefore, the magnetic recording drive 131 can be manufactured by using the slider 2, 51, 62, 71, 98, 105 or 111 according to the present invention.

A center of pressing load of the spring arm 132 to the head slider 2, 51, 62, 71, 98, 105 or 111 is placed in a region surrounded by a plurality of projections.

What is claimed is:

1. A head slider for a magnetic recording drive, comprising:
   a substrate having an air inflow end and an air outflow end and defining a main plane facing a magnetic disk, said substrate holding a transducer at said air outflow end, information being read or written from/in said magnetic disk by said transducer;
   a front rail formed on said main plane near said air inflow end, said front rail defining a front rail plane facing said magnetic disk;
   first and second side rails defining first and second side rail planes, said first and second side rail planes facing said magnetic disk, said first and second side rails arranged on said substrate for receiving a floating force caused by rotation of said magnetic disk;
   a first projection arranged on said front rail and extending from said front rail plane, said first projection placed near said air inflow end of said substrate;
   a second projection arranged on said second side rail and extending from said second side rail plane, said second projection placed nearer said air outflow end of said substrate than said first projection; and
   a third projection arranged on said first side rail and extending from said first rail plane, said third projection placed nearer said air outflow end of said substrate than said first projection;
   whereby a loading force from said head slider upon said magnetic disk when said head slider is in contact with said magnetic disk is divided solely among said first projection, said second projection and said third projection.

2. The head slider for the magnetic recording drive according to claim 1, wherein said first projection, said second projection, and said third projection define endpoints of an isosceles triangle.

3. The head slider for the magnetic recording drive according to claim 1, wherein a center of a force that biases said substrate toward the magnetic disk acts upon a region surrounded by said first projection, said second projection and said third projection.

4. The head slider for the magnetic recording drive according to claim 1, wherein each of said first, second and third projections is made of a material selected from the group consisting of amorphous carbon, diamond-like carbon and oxide.

5. The head slider for the magnetic recording drive according to claim 1, wherein said front rail further comprises a taper plane placed on said air inflow end of said substrate and a boundary region is defined between said taper plane and said front rail plane, said front rail plane extending from said boundary region and toward said air outflow end of the substrate, and said first projection being placed on said boundary region and intersecting said taper plane and said front rail plane, said first projection having a bent portion curved in a thickness direction of said substrate perpendicular to said main plane of said substrate.

6. The head slider for the magnetic recording drive according to claim 5, wherein said first projection has a top surface formed in an elliptical shape.

7. The head slider for the magnetic recording drive according to claim 1, further comprising a negative pressure generating region, formed on said main plane of said substrate facing said magnetic disk.

8. The head slider for the magnetic recording drive according to claim 1, wherein said front rail plane is separated from said first and second rail planes by slits opened to said air inflow end, and a negative pressure generating portion is formed in a region between the front rail plane and said first and second side rail planes at a center region of said main plane and near an air outflow end of said substrate.

9. The head slider for the magnetic recording drive according to claim 1, wherein an area of said first projection is smaller than a total area of said second and third projections.

* * * * *